United States Patent
Kamei et al.

(10) Patent No.: US 10,098,366 B2
(45) Date of Patent: Oct. 16, 2018

(54) INDOOR AIR CONDITIONING DEVICE AND CONTAINER FREEZER DEVICE COMPRISING SAME

(71) Applicant: DAIKIN INDUSTRIES, LTD., Osaka-shi, Osaka (JP)

(72) Inventors: Noritaka Kamei, Osaka (JP); Kouji Yamamoto, Osaka (JP); Kazuhide Mizutani, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/754,519

(22) PCT Filed: Aug. 24, 2016

(86) PCT No.: PCT/JP2016/003863
§ 371 (c)(1),
(2) Date: Feb. 22, 2018

(87) PCT Pub. No.: WO2017/038056
PCT Pub. Date: Mar. 9, 2017

(65) Prior Publication Data
US 2018/0235247 A1 Aug. 23, 2018

(30) Foreign Application Priority Data
Aug. 28, 2015 (JP) .................. 2015-169140

(51) Int. Cl.
*B01D 53/047* (2006.01)
*F25D 11/00* (2006.01)
(Continued)

(52) U.S. Cl.
CPC ............ *A23B 7/148* (2013.01); *A23L 3/3427* (2013.01); *B01D 53/047* (2013.01); *F25D 11/00* (2013.01);
(Continued)

(58) Field of Classification Search
CPC .. B01D 53/04; B01D 53/047; B01D 53/0454; B01D 2253/108; B01D 2257/102;
(Continued)

(56) References Cited

U.S. PATENT DOCUMENTS 4,015,956 A 4/1977 Münzner et al.
4,142,372 A 3/1979 Kato et al.
(Continued)

FOREIGN PATENT DOCUMENTS

JP 48-92292 A 11/1973
JP 53-52646 A 5/1978
(Continued)

OTHER PUBLICATIONS

International Search Report (PCT/ISA/210) issued in PCT/JP2016/003863, dated Nov. 22, 2016.

*Primary Examiner* — Frank M Lawrence, Jr.
(74) *Attorney, Agent, or Firm* — Birch, Stewart, Kolasch & Birch, LLP

(57) ABSTRACT

Disclosed herein is a CA system which allows first and second adsorption columns to alternately perform an adsorption operation and a desorption operation so that nitrogen-enriched air having a higher nitrogen concentration and a lower oxygen concentration than the air is produced and supplied into the container. The CA system executes a second operation mode in which the nitrogen-enriched air produced for a predetermined time since the desorption operation was started is discharged to the outside of the container, and the nitrogen-enriched air produced until the end of the desorption operation since the predetermined time passed is supplied into the container.

5 Claims, 14 Drawing Sheets

(51) Int. Cl.
  *A23B 7/148*   (2006.01)
  *A23L 3/3427*  (2006.01)
  *F25D 17/04*   (2006.01)

(52) U.S. Cl.
  CPC ........ *F25D 17/042* (2013.01); *A23V 2002/00* (2013.01); *B01D 2253/108* (2013.01); *B01D 2257/102* (2013.01); *B01D 2257/80* (2013.01); *B01D 2259/402* (2013.01); *B01D 2259/40007* (2013.01); *B01D 2259/4566* (2013.01)

(58) Field of Classification Search
  CPC ...... B01D 2257/80; B01D 2259/40007; B01D 2259/402; B01D 2259/4566; A23B 7/148; A23L 3/3427; F25D 11/00; F25D 17/042; A23V 2002/00
  USPC ........ 96/111, 121; 95/130; 454/80, 118, 173
  See application file for complete search history.

(56) References Cited

U.S. PATENT DOCUMENTS

| | | | |
|---|---|---|---|
| 5,084,075 A | | 1/1992 | Sircar |
| 5,249,428 A | * | 10/1993 | Barbe .................... A23B 7/148 426/418 |
| 5,451,248 A | * | 9/1995 | Sadkowski ............ A23B 7/144 426/419 |
| 5,457,963 A | | 10/1995 | Cahill-O'Brien et al. |
| 5,649,995 A | * | 7/1997 | Gast, Jr. ................ A23L 3/3418 426/419 |
| 5,795,370 A | * | 8/1998 | Garrett .................. A23L 3/3445 96/130 |
| 5,799,495 A | * | 9/1998 | Gast, Jr. ................ A23B 7/148 62/78 |
| 2016/0227802 A1 | | 8/2016 | Tanaka et al. |
| 2016/0245555 A1 | | 8/2016 | Tanaka et al. |

FOREIGN PATENT DOCUMENTS

| | | |
|---|---|---|
| JP | 4-93580 A | 3/1992 |
| JP | 4-227812 A | 8/1992 |
| JP | 8-168 A | 1/1996 |
| JP | 2007-153629 A | 6/2007 |
| JP | 2015-72103 A | 4/2015 |
| WO | WO 98/53710 A1 | 12/1998 |
| WO | WO 2015/049840 A1 | 4/2015 |

* cited by examiner

FIG.9

TIMING OF SWITCHING OF VALVES AND STATES OF ADSORPTION COLUMNS

| OPERATION | FIRST OPERATION | PRESSURE EQUALIZATION OPERATION | SECOND OPERATION | PRESSURE EQUALIZATION OPERATION |
|---|---|---|---|---|
| FIRST DIRECTIONAL CONTROL VALVE | FIRST STATE | | SECOND STATE | FIRST STATE |
| SECOND DIRECTIONAL CONTROL VALVE | FIRST STATE | | SECOND STATE | |
| FIRST ADSORPTION COLUMN | PRESSURIZED/ADSORPTION | PRESSURIZED/ADSORPTION | DEPRESSURIZED/DESORPTION | PRESSURIZED/ADSORPTION |
| SECOND ADSORPTION COLUMN | DEPRESSURIZED/DESORPTION | PRESSURIZED/ADSORPTION | PRESSURIZED/ADSORPTION | PRESSURIZED/ADSORPTION |

FIG.10

FIRST OPERATION MODE (→8%)

| OPERATION | FIRST OPERATION | | SECOND OPERATION | |
|---|---|---|---|---|
| | | PRESSURE EQUALIZATION OPERATION | | PRESSURE EQUALIZATION OPERATION |
| EXHAUST ON-OFF VALVE | CLOSE | | | |
| SUPPLY ON-OFF VALVE | OPEN | | | |
| NITROGEN-ENRICHED AIR | SUPPLIED | | | |

FIG.11

SECOND OPERATION MODE (8%→5%)

| OPERATION | FIRST OPERATION | PRESSURE EQUALIZATION OPERATION | SECOND OPERATION | PRESSURE EQUALIZATION OPERATION |
|---|---|---|---|---|
| EXHAUST ON-OFF VALVE | CLOSE | | OPEN | CLOSE |
| SUPPLY ON-OFF VALVE | OPEN | | CLOSE | OPEN |
| NITROGEN-ENRICHED AIR | SUPPLIED | | DISCHARGED | SUPPLIED |

FIG.12

THIRD OPERATION MODE (5% → 3%)

| OPERATION | FIRST OPERATION | PRESSURE EQUALIZATION OPERATION | SECOND OPERATION | PRESSURE EQUALIZATION OPERATION |
|---|---|---|---|---|
| EXHAUST ON-OFF VALVE | OPEN | CLOSE | OPEN | CLOSE |
| SUPPLY ON-OFF VALVE | CLOSE | OPEN | CLOSE | OPEN |
| NITROGEN-ENRICHED AIR | DISCHARGED | SUPPLIED | DISCHARGED | SUPPLIED |

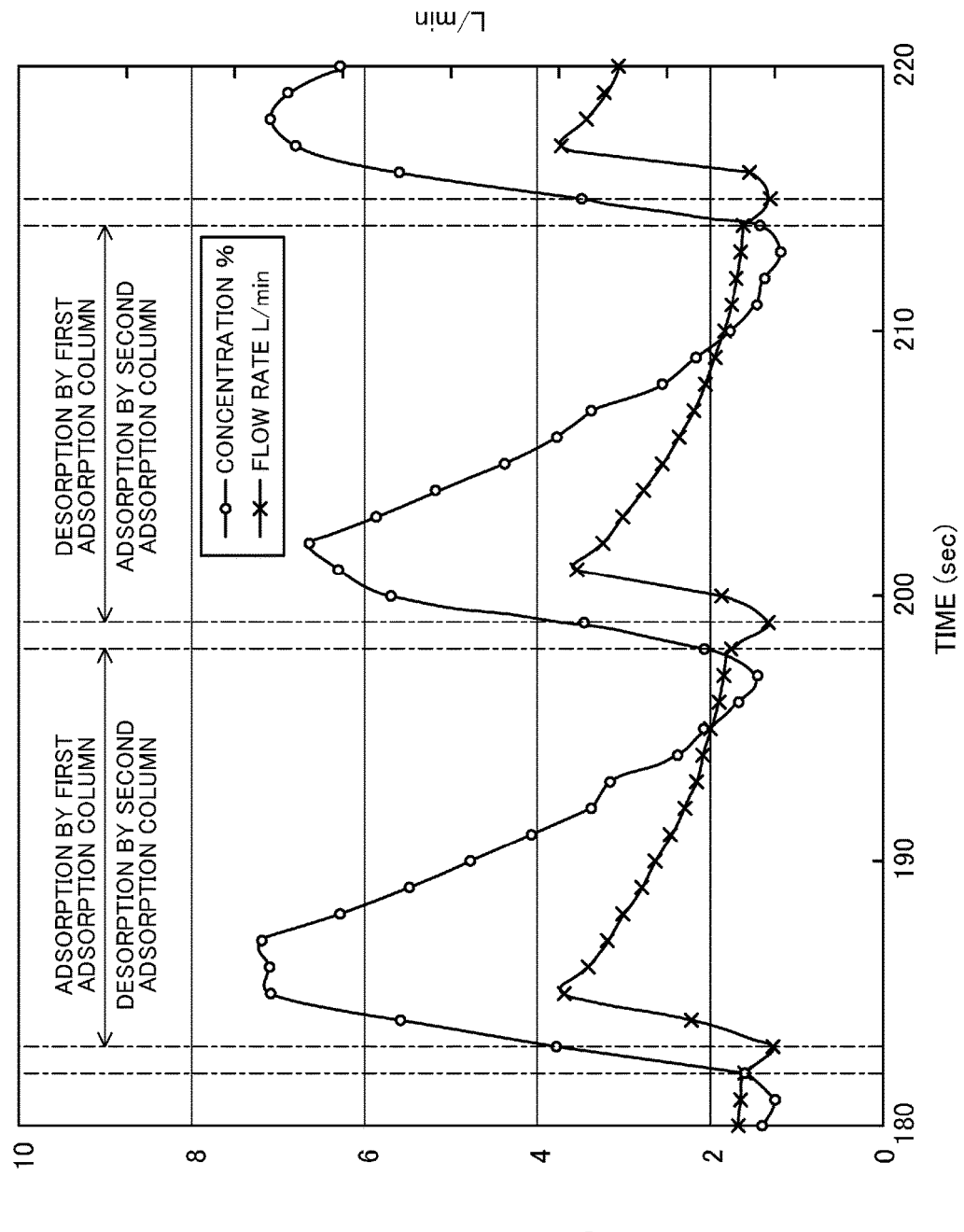

INDOOR AIR CONDITIONING DEVICE AND CONTAINER FREEZER DEVICE COMPRISING SAME

TECHNICAL FIELD

The present invention relates to an inside air control system which controls the composition of air in a container, and a container refrigeration apparatus including the same.

BACKGROUND ART

Container refrigeration apparatuses including a refrigerant circuit performing a refrigeration cycle have been used to cool air in a container for use in, e.g., marine transportation (see, e.g., Patent Document 1). The container is loaded with plants such as bananas and avocados, for example. Plants breathe by absorbing oxygen in the air and releasing carbon dioxide even after they have been harvested. The plants lose their nourishment and moisture as they breathe. Thus, the degree of freshness of the plants decreases. Thus, the oxygen concentration in the container is preferably lowered not to cause breathing problems.

Patent Document 1 discloses an inside air control system. In this inside air control system, an adsorbent which adsorbs a nitrogen component in the air when pressurized is used to produce nitrogen-enriched air having a lower oxygen concentration and a higher nitrogen concentration than the air, and this nitrogen-enriched air is supplied into the container to reduce the oxygen concentration of the air in the container, making it easier to keep the plants fresh. This inside air control system performs an adsorption operation of sending pressurized air using an air pump into an adsorption column housing the adsorbent to allow the adsorbent to adsorb the nitrogen component, and then performs a desorption operation of sucking the air using the air pump from the adsorption column to allow the adsorbent to desorb the nitrogen component adsorbed. As a result, the nitrogen-enriched air is produced.

CITATION LIST

Patent Documents

[Patent Document 1] Japanese Unexamined Patent Publication No. 2015-072103

SUMMARY OF THE INVENTION

Technical Problem

The nitrogen-enriched air produced by the inside air control system described above has a high oxygen concentration just after the start of the desorption operation, which gradually decreases with time as shown in FIG. 14. This is because the outside air supplied during the adsorption operation remains in the adsorption column and pipes just after the start of the desorption operation, and is contained in the nitrogen-enriched air. Moreover, this inside air control system supplies the whole nitrogen-enriched air produced during the desorption operation into the container. Specifically, irrespective of the ability to supply the nitrogen-enriched air with a very low oxygen concentration, the inside air control system supplies the nitrogen-enriched air having a relatively high oxygen concentration produced just after the start of the desorption operation into the container. Therefore, the oxygen concentration of the whole nitrogen-enriched air supplied during the desorption operation averages to a medium level. Thus, the oxygen concentration of the air in the container cannot be controlled to be lower than the average oxygen concentration of the nitrogen-enriched air produced by the inside air control system.

In view of the foregoing background, the present invention is directed to an inside air control system which produces nitrogen-enriched air and supplies it into a container to control the composition of air in the container. It is an object of the present invention to allow the inside air control system to control an oxygen concentration of the air in the container to be lower than an average oxygen concentration of the nitrogen-enriched air thus produced.

Solution to the Problem

A first aspect of the present disclosure is directed to an inside air control system provided for a container (11) housing breathing plants (15). The inside air control system includes: adsorption columns (34, 35), each of which houses an adsorbent that adsorbs a nitrogen component in air; a first pump mechanism (31a) which supplies outside air to the adsorption columns (34, 35) to pressurize the adsorption columns (34, 35), thereby allowing each of the adsorption columns (34, 35) to perform an adsorption operation of adsorbing the nitrogen component in the air onto the adsorbent; and a second pump mechanism (31b) which sucks the air from the adsorption columns (34, 35) to depressurize the adsorption columns (34, 35), thereby allowing each of the adsorption columns (34, 35) to perform a desorption operation of desorbing the nitrogen component adsorbed onto the adsorbent in the air. The inside air control system allows the adsorption columns (34, 35) to alternately perform the adsorption operation and the desorption operation so that nitrogen-enriched air having a higher nitrogen concentration and a lower oxygen concentration than the air is produced and supplied into the container (11), and the inside air control system performs a partial supply operation of discharging to the outside of the container (11) the nitrogen-enriched air produced for a predetermined time since the desorption operation was started, and then supplying into the container (11) the nitrogen-enriched air produced until the end of the desorption operation since the predetermined time passed.

According to the first aspect of the present disclosure, the adsorption operation and the desorption operation are alternately performed in the adsorption columns (34, 35) to produce the nitrogen-enriched air, which is supplied into the container (11) to reduce the oxygen concentration of the air in the container (11).

Further, according to the first aspect of the present disclosure, the inside air control system (60) performs a partial supply operation. In the partial supply operation, the nitrogen-enriched air produced for a predetermined time since the desorption operation was started is not supplied into, but discharged to the outside of, the container (11). Then, only the nitrogen-enriched air produced until the end of the desorption operation since the predetermined time passed is supplied into the container (11). In the partial supply operation, the nitrogen-enriched air having a relatively high oxygen concentration produced in an initial stage of the desorption operation is not supplied into, but discharged to the outside of, the container (11). Thus, only the nitrogen-enriched air having a relatively low oxygen concentration produced after the outside air left in the adsorption columns (34, 35) and the pipes has been discharged is supplied into the container (11).

A second aspect of the present disclosure is an embodiment of the first aspect of the present disclosure. In the second aspect, the inside air control system performs a whole supply operation of supplying the whole nitrogen-enriched air produced during a period from the start to end of the desorption operation into the container (11) until an oxygen concentration of the air in the container (11) reaches a predetermined concentration or lower, and the inside air control system performs the partial supply operation when the oxygen concentration of the air in the container (11) has reached the predetermined concentration or lower.

Just like in the partial supply operation, if part of the nitrogen-enriched air produced in the desorption operation is not supplied into, but discharged to the outside of, the container (11), the amount of the nitrogen-enriched air supplied into the container (11) decreases. Thus, if the partial supply operation is performed when the air in the container (11) has a high oxygen concentration, the oxygen concentration of the air in the container (11) is not smoothly lowered because the amount of the nitrogen-enriched air having a low oxygen concentration supplied into the container (11) is too small.

To cope with such a problem, according to the second aspect of the present disclosure, the inside air control system performs the whole supply operation of supplying the whole nitrogen-enriched air produced in the desorption operation into the container (11) until the oxygen concentration of the air in the container (11) decreases to a predetermined concentration or lower. Then, when the oxygen concentration of the air in the container (11) has decreased to some extent, the partial supply operation of discharging to the outside of the container the nitrogen-enriched air having a relatively high oxygen concentration produced in the initial stage of the desorption operation, and supplying only the nitrogen-enriched air having a relatively low oxygen concentration into the container (11).

A third aspect of the present disclosure is an embodiment of the first or second aspect of the present disclosure. In the third aspect, time for discharging the nitrogen-enriched air to the outside of the container (11) in the partial supply operation increases with decrease in the oxygen concentration of the air in the container (11).

The oxygen concentration of the nitrogen-enriched air supplied into the container (11) decreases with increase in the time for discharging the nitrogen-enriched air to the outside of the container (11) in the partial supply operation. On the other hand, the amount of the nitrogen-enriched air supplied into the container (11) decreases with increase in the time for discharging the nitrogen-enriched air to the outside of the container (11) in the partial supply operation. Thus, even if the nitrogen-enriched air having a low oxygen concentration is supplied into the container (11) while the air in the container has a high oxygen concentration, the oxygen concentration of the air in the container (11) is not smoothly lowered if the amount of the nitrogen-enriched supplied is too small.

To cope with such a problem, according to the third aspect of the present disclosure, the time for discharging the nitrogen-enriched air to the outside of the container (11) in the partial supply operation increases with decrease in the oxygen concentration of the air in the container (11). Specifically, when the oxygen concentration of the air in the container (11) is relatively high, higher priority is given to the amount of the nitrogen-enriched air to be supplied into the container than to the oxygen concentration thereof, and the nitrogen-enriched air having a slightly high oxygen concentration is also supplied, together with the nitrogen-enriched air having a very low oxygen concentration, into the container (11). Then, when the oxygen concentration of the air in the container (11) has decreased to some extent, higher priority is now given to the oxygen concentration of the nitrogen-enriched air to be supplied into the container (11) than to the amount thereof, and only the nitrogen-enriched air having a very low oxygen concentration is supplied into the container.

A fourth aspect of the present disclosure is an embodiment of any one of the first to third aspects of the present disclosure. In the fourth aspect, the inside air control system further includes: a supply passage (44) which is connected to an outlet of the second pump mechanism (31b) and guides the nitrogen-enriched air discharged from the second pump mechanism (31b) into the container (11); an oxygen discharge passage (45) which is connected to the adsorption columns (34, 35), and discharges, out of the inside air control system, oxygen-enriched air having a lower nitrogen concentration and a higher oxygen concentration than the air produced through the adsorption operation in the adsorption columns (34, 35); an exhaust connection passage (71) connecting the supply passage (44) and the oxygen discharge passage (45) together; an exhaust on-off valve (72) provided at the exhaust connection passage (71) to open and close the exhaust connection passage (71); a supply on-off valve (73) which is provided at the supply passage (44) to be located further toward the inside of the container (11) than a junction where the exhaust connection passage (71) is connected, and opens and closes the supply passage (44); and a controller (55) which controls switching between a gas discharge operation in which the exhaust on-off valve (72) is instructed to open and the supply on-off valve (73) is instructed to close so that the nitrogen-enriched air produced is discharged to the outside of the container (11), and a gas supply operation in which the exhaust on-off valve (72) is instructed to close and the supply on-off valve (73) is instructed to open so that the nitrogen-enriched air produced is supplied into the container (11).

According to the fourth aspect, when the controller (55) instructs the exhaust on-off valve (72) to open and the supply on-off valve (73) to close, the gas discharge operation is performed to allow the whole nitrogen-enriched air produced to flow from the supply passage (44) via the exhaust connection passage (71) to the oxygen discharge passage (45), and to be discharged outside the container together with the oxygen-enriched air. On the other hand, when the controller (55) instructs the exhaust on-off valve (72) to close and the supply on-off valve (73) to open, the gas supply operation is performed to supply the whole nitrogen-enriched air produced into the container (11) via the supply passage (44).

A fifth aspect of the present disclosure is an embodiment of the fourth aspect of the present disclosure. In the fifth aspect, the inside air control system further includes: a measurement passage (81) which guides the nitrogen-enriched air flowing through the supply passage (44) toward an oxygen sensor (51) provided in the container (11); and a measurement on-off valve (82) provided at the measurement passage (81) to open and close the measurement passage (81), wherein the controller (55) instructs the exhaust on-off valve (72) and the supply on-off valve (73) to close, and the measurement on-off valve (82) to open, thereby performing a supply air measurement operation of allowing the oxygen sensor (51) to measure an oxygen concentration of the nitrogen-enriched air.

According to the fifth aspect of the present disclosure, the measurement on-off valve (82) is instructed to open, and the supply on-off valve (73) and the exhaust on-off valve (72) are instructed to close. Then, the nitrogen-enriched air does not flow beyond the supply on-off valve (73) in the supply passage (44), and the whole nitrogen-enriched air flowing through the supply passage (44) is guided toward the oxygen sensor (51) via the measurement passage (81). As a result, the oxygen sensor (51) measures the oxygen concentration of the nitrogen-enriched air.

A sixth aspect of the present disclosure is directed to a container refrigeration apparatus attached to a container (11) housing breathing plants (15). The container refrigeration apparatus includes: a refrigerant circuit (20) which performs a refrigeration cycle to cool air in the container (11); and an inside air control system (60) including a gas supply device (30) which produces nitrogen-enriched air having a higher nitrogen concentration and a lower oxygen concentration than the air and supplies the nitrogen-enriched air into the container (11), and an exhaust portion (46) through which the air in the container (11) is exhausted to the outside of the container (11), the inside air control system (60) controlling a composition of the air in the container (11), wherein the container refrigeration apparatus controls a temperature and composition of the air in the container (11) to a desired temperature and composition, and the inside air control system (60) is comprised of the inside air control system (60) of any one of the first to fifth aspects of the present disclosure.

According to the sixth aspect of the present disclosure, a refrigeration cycle is performed in the refrigerant circuit (20), which cools the air in the container (11). In addition, the composition of the air in the container (11) is controlled by supplying the nitrogen-enriched air produced in the inside air control system (60) into the container (11).

Advantages of the Invention

According to the first aspect of the present disclosure, the inside air control system (60) performs a partial supply operation. In the partial supply operation, the nitrogen-enriched air produced for a predetermined time since the desorption operation was started is not supplied into, but discharged to the outside of, the container (11). Then, the nitrogen-enriched air produced until the end of the desorption operation since the predetermined time passed is supplied into the container (11). In this partial supply operation, the nitrogen-enriched air having a relatively high oxygen concentration produced in the initial stage of the desorption operation is not supplied into, but discharged to the outside of, the container (11). Thus, only the nitrogen-enriched air having a relatively low oxygen concentration produced after the outside air left in the adsorption columns (34, 35) and the pipes has been discharged can be supplied into the container (11). Thus, the oxygen concentration of the air in the container (11) can be controlled to be lower than a mean value of the oxygen concentration (hereinafter will be referred to as a "mean oxygen concentration") of the nitrogen-enriched air produced through the adsorption operation and the desorption operation performed alternately.

According to the second aspect of the present disclosure, the inside air control system performs the whole supply operation of supplying the whole nitrogen-enriched air produced in the desorption operation into the container (11) until the oxygen concentration of the air in the container (11) decreases to a predetermined concentration or lower. Then, when the oxygen concentration of the air in the container (11) has decreased to the predetermined concentration or lower, the inside air control system performs the partial supply operation of discharging the nitrogen-enriched air having a relatively high oxygen concentration produced in the initial stage of the desorption operation to the outside of the container, and supplying only the nitrogen-enriched air having a relatively low oxygen concentration into the container (11). Thus, when the oxygen concentration of the air in the container (11) is relatively high, higher priority is given to the amount of the nitrogen-enriched air to be supplied into the container than to the oxygen concentration thereof and the whole nitrogen-enriched air produced in the desorption operation is supplied into the container (11). This can quickly lower the oxygen concentration of the air in the container (11). Then, when the oxygen concentration of the air in the container (11) is reduced to some extent, higher priority is given to the oxygen concentration of the nitrogen-enriched air to be supplied into the container than to the amount thereof, and only the nitrogen-enriched air having a relatively low oxygen concentration is supplied into the container (11). This can quickly reduce the oxygen concentration of the air in the container (11) to be much lower.

According to the third aspect of the present disclosure, time for discharging the nitrogen-enriched air to the outside of the container (11) in the partial supply operation increases with decrease in the oxygen concentration of the air in the container (11). Thus, when the oxygen concentration of the air in the container (11) is relatively high, higher priority is given to the amount of the nitrogen-enriched air to be supplied into the container than to the oxygen concentration thereof, and the nitrogen-enriched air having a slightly high oxygen concentration is also supplied into the container (11), together with the nitrogen-enriched air having a very low oxygen concentration. This can quickly lower the oxygen concentration of the air in the container (11). Then, when the oxygen concentration of the air in the container (11) is reduced to some extent, higher priority is given to the oxygen concentration of the nitrogen-enriched air to be supplied into the container than to the amount thereof, and only the nitrogen-enriched air having a very low oxygen concentration is supplied into the container (11). This can reduce the oxygen concentration of the air in the container (11) to be much lower.

According to the fourth aspect of the present disclosure, the inside air control system includes the exhaust connection passage (71) connecting the supply passage (44) and the oxygen discharge passage (45) together, the exhaust on-off valve (72), the supply on-off valve (73), and the controller (55) which controls switching between the gas supply operation and the gas discharge operation through on-off control of the exhaust on-off valve (72) and the supply on-off valve (73). According to the fourth aspect, such a simple configuration and simple control of switching the on-off state of the exhaust on-off valve (72) and the supply on-off valve (73) make it easy to execute the partial supply operation of switching between the gas supply operation and the gas discharge operation.

According to the fifth aspect of the present disclosure, the inside air control system includes the measurement passage (81) which guides the nitrogen-enriched air produced in the inside air control system (60) and flowing through the supply passage (44) toward the oxygen sensor (51) provided in the container (11), and the measurement on-off valve (82) which opens and closes the measurement passage (81). According to this configuration, the controller (55) instructs the measurement on-off valve (82) to open, and the exhaust on-off valve (72) and the supply on-off valve (73) to close, thereby guiding the nitrogen-enriched air flowing through the supply passage (44) toward the oxygen sensor (51).

Thus, the supply air measurement operation of measuring the oxygen concentration of the nitrogen-enriched air can be performed. Measuring the oxygen concentration of the nitrogen-enriched air through the supply air measurement operation makes it possible to check the performance of the inside air control system (60), i.e., determine whether the nitrogen-enriched air of a desired nitrogen concentration is produced or not. That is, whether the inside air control system (60) has failed or not can be determined by using the oxygen sensor (51) which measures the oxygen concentration of the air in the container (11), without providing a nitrogen concentration sensor for the inside air control system (60).

According to the sixth aspect of the present disclosure, used is the inside air control system (60) which performs a partial supply operation. In the partial supply operation, the nitrogen-enriched air produced for a predetermined time since the desorption operation was started is not supplied into, but discharged to the outside of, the container (11). Then, the nitrogen-enriched air produced until the end of the desorption operation since the predetermined time passed is supplied into the container (11). In this way, part of the nitrogen-enriched air which is produced in the inside air control system (60) in the initial stage of the desorption operation and has a relatively high oxygen concentration is discharged to the outside of the container (11), so that only the nitrogen-enriched air produced thereafter having a relatively low oxygen concentration can be supplied into the container (11). Thus, the oxygen concentration of the air in the container (11) can be controlled to be lower than the mean oxygen concentration.

BRIEF DESCRIPTION OF THE DRAWINGS

FIG. 9 is a timing chart illustrating timing of switching of valves and the states of adsorption columns during a gas production operation of the CA system in the container refrigeration apparatus of the first embodiment.

FIG. 10 is a timing chart illustrating timing of switching of valves in a first operation mode of the CA system in the container refrigeration apparatus of the first embodiment.

FIG. 11 is a timing chart illustrating timing of switching of valves in a second operation mode of the CA system in the container refrigeration apparatus of the first embodiment.

FIG. 12 is a timing chart illustrating timing of switching of valves in a third operation mode of a CA system in a container refrigeration apparatus of a second embodiment.

FIG. 14 is a graph illustrating variation with time of an oxygen concentration of a nitrogen-enriched air produced by a conventional inside air control system.

DETAILED DESCRIPTION

Embodiments of the present invention will now be described in detail with reference to the drawings. Note that the following description of embodiments is merely an example in nature, and is not intended to limit the scope, applications, or use of the present invention.

First Embodiment

Figure 1:
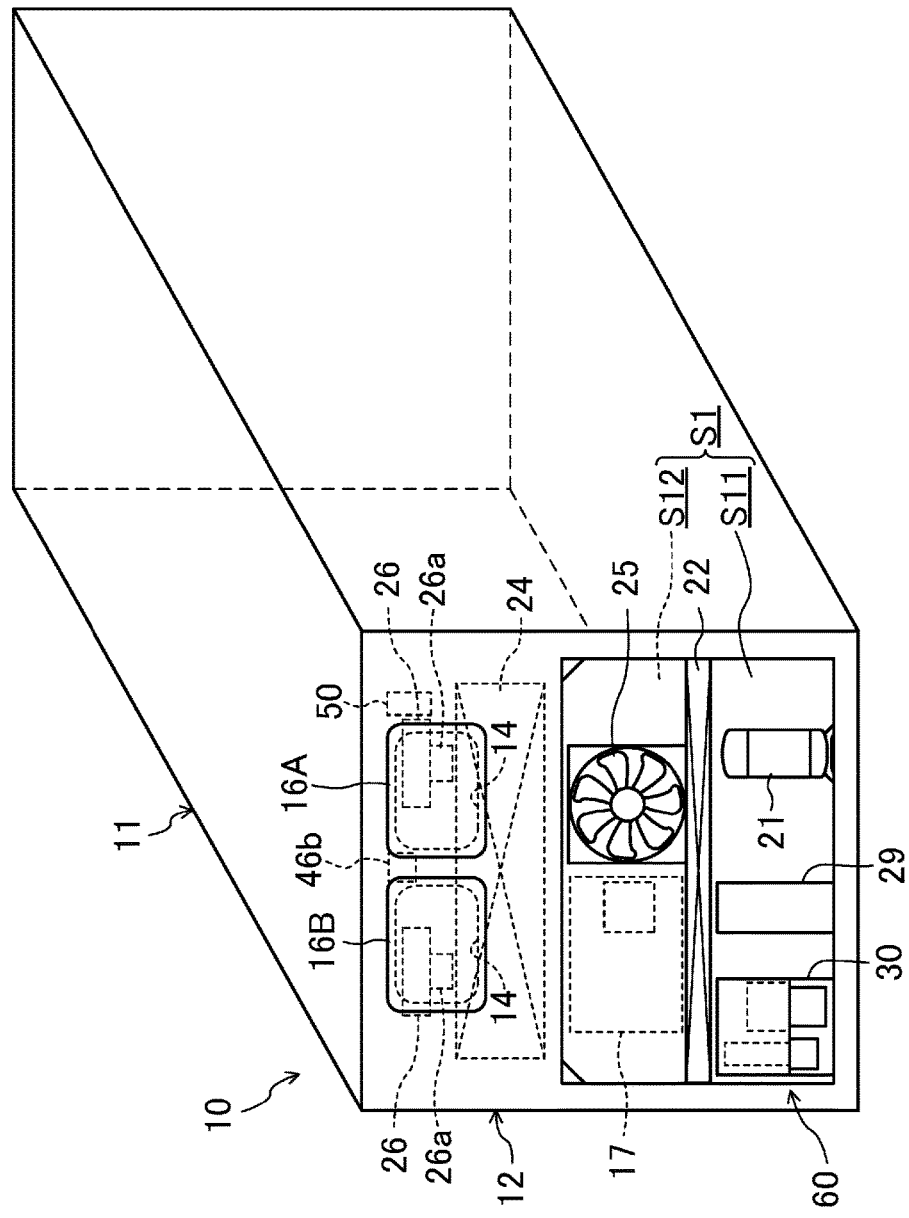
FIG. 1 is a perspective view illustrating a container refrigeration apparatus of a first embodiment as viewed from outside.
Figure 2:
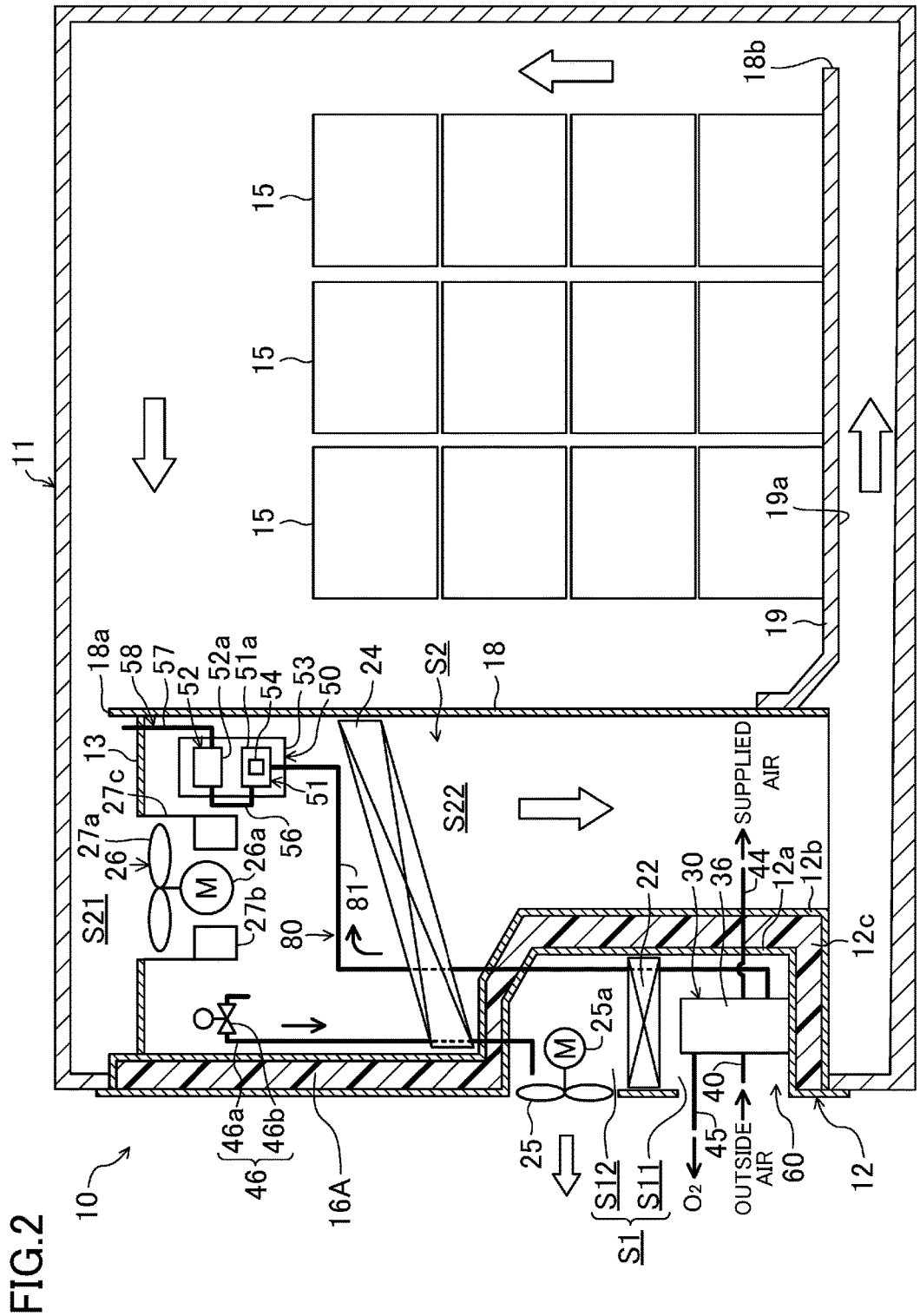
FIG. 2 is a cross-sectional view illustrating a general configuration of the container refrigeration apparatus of the first embodiment.

As shown in FIGS. 1 and 2, a container refrigeration apparatus (10) is provided for a container (11) for use in, e.g., marine transportation, and cools the air in the container (11). Boxed plants (15) are stored in the container (11). The plants (15) breathe by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) has the shape of an elongate box with an open end surface. The container refrigeration apparatus (10) includes a casing (12), a refrigerant circuit (20), and a controlled atmosphere (CA) system (inside air control system) (60), and is attached to close an open end of the container (11).

<Casing>

As shown in FIG. 2, the casing (12) includes an exterior wall (12a) disposed outside the container (11), and an interior wall (12b) disposed inside the container (11). The exterior and interior walls (12a) and (12b) may be made of an aluminum alloy, for example.

The exterior wall (12a) is attached to the periphery of the opening of the container (11) so as to close the open end of the container (11). The exterior wall (12a) is formed such that the lower part of the exterior wall (12a) protrudes into the container (11).

The interior wall (12b) is disposed to face the exterior wall (12a). The interior wall (12b) protrudes into the container (11) just like the lower part of the exterior wall (12a). A thermal insulator (12c) fills the space between the interior and exterior walls (12b, 12a).

As can be seen, the lower part of the casing (12) is formed so as to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing (12). The two access openings (14) are closed respectively by first and second access doors (16A, 16B) which are openable and closable. Each of the first and second access doors (16A. 16B) includes, just like the casing (12), an exterior wall, an interior wall, and a thermal insulator.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the interior of the container (11).

A suction port (18a) is formed between the upper end of the partition plate (18) and a ceiling surface of the container (11). Air in the container (11) is taken into the internal storage space (S2) through the suction port (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) partitions the internal storage space (S2) into a primary space (S21) on the suction side of the internal fans (26), and a secondary space (S22) on the blowout side of the internal fans (26). In this embodiment, the partition wall (13) divides the internal storage space (S2) horizontally such that the primary space (S21) on the suction side is disposed above the secondary space (S22) on the blowout side.

A floorboard (19) is disposed in the container (11) with a gap left between the floorboard (19) and the bottom surface of the container (11). Boxed plants (15) are placed on the floorboard (19). An underfloor path (19a) is formed between the floorboard (19) and the bottom surface of the container (11). A gap is left between the lower end of the partition plate (18) and the bottom surface of the container (11), and communicates with the underfloor path (19a).

A blowout port (18b) through which the air which has been cooled by the container refrigeration apparatus (10) is blown into the container (11) is provided at an end of the floorboard (19) opposite from the open end of the container (11) (on the right side in FIG. 2).

<Configuration and Arrangement of Refrigerant Circuit and Other Components>

Figure 3:
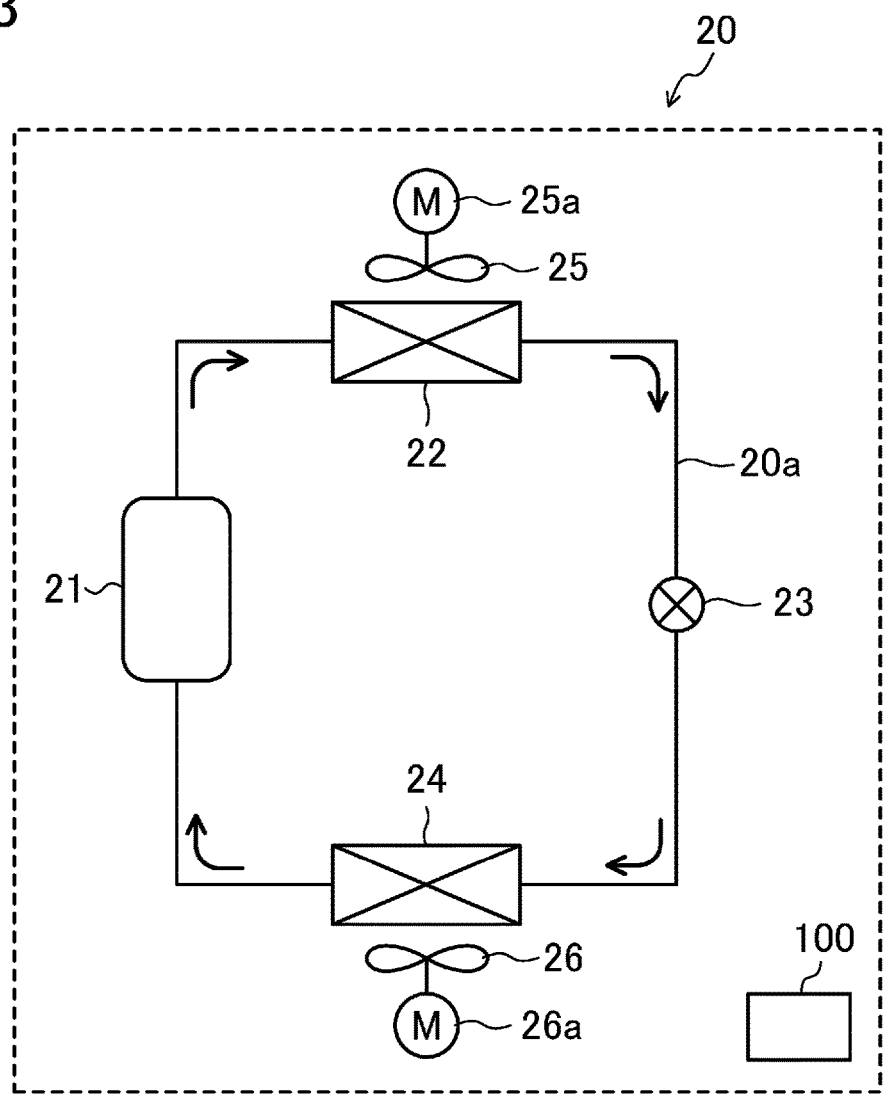
FIG. 3 is a piping diagram illustrating a configuration of a refrigerant circuit in the container refrigeration apparatus of the first embodiment.

As shown in FIG. 3, the refrigerant circuit (20) is a closed circuit in which a compressor (21), a condenser (22), an expansion valve (23), and an evaporator (24) are connected together in this order by refrigerant piping (20a).

An external fan (25) is disposed near the condenser (22). The external fan (25) is driven in rotation by an external fan motor (25a), guides the air in the exterior space of the container (11) (i.e., outside air) into the external storage space (S1), and sends it to the condenser (22). In the condenser (22), heat is exchanged between a refrigerant compressed in the compressor (21) and flowing through the condenser (22) and the outside air sent to the condenser (22) by the external fan (25). In this embodiment, the external fan (25) is comprised of a propeller fan.

Two internal fans (26) are disposed near the evaporator (24). The internal fans (26) are driven in rotation by internal fan motors (26a), and draw the air in the container (11) through a suction port (18a) and blow the air toward the evaporator (24). In the evaporator (24), heat is exchanged between a refrigerant having a pressure dropped by the expansion valve (23) and flowing through the evaporator (24) and the air in the container sent to the evaporator (24) by the internal fans (26).

As shown in FIG. 2, each of the internal fans (26) includes a propeller fan (rotary vane) (27a), a plurality of stationary vanes (27b), and a fan housing (27c). The propeller fan (27a) is coupled to the internal fan motor (26a), and driven in rotation by the internal fan motor (26a) about a rotation axis to blow the air in an axial direction. The plurality of stationary vanes (27b) are disposed on the blowout side of the propeller fan (27a) to rectify the flow of swirling air blown from the propeller fan (27a). The fan housing (27c) is comprised of a cylindrical member with the plurality of stationary vanes (27b) attached to its inner peripheral surface, and extends to, and surrounds, the outer periphery of the propeller fan (27a).

As shown in FIG. 1, the compressor (21) and the condenser (22) are housed in the external storage space (S1). The condenser (22), located in the middle of the external storage space (S1) in the vertical direction, divides the external storage space (S1) into a lower first space (S11) and an upper second space (S12). In the first space (S11), the compressor (21), an inverter box (29) which houses a driver circuit for driving the compressor (21) at a variable velocity, and a gas supply device (30) of the CA system (60) are disposed. The external fan (25) and an electrical component box (17) are disposed in the second space (S12). The first space (S11) is open toward the exterior space of the container (11). A plate member is arranged to close the second space (S12) from the exterior space of the container such that only a blowout port of the external fan (25) is open toward the exterior space of the container.

As shown in FIG. 2, the evaporator (24) is housed in the secondary space (S22) of the internal storage space (S2). The two internal fans (26) are disposed above the evaporator (24) in the internal storage space (S2) and arranged side by side in the width direction of the casing (12).

<CA System>

Figure 4:
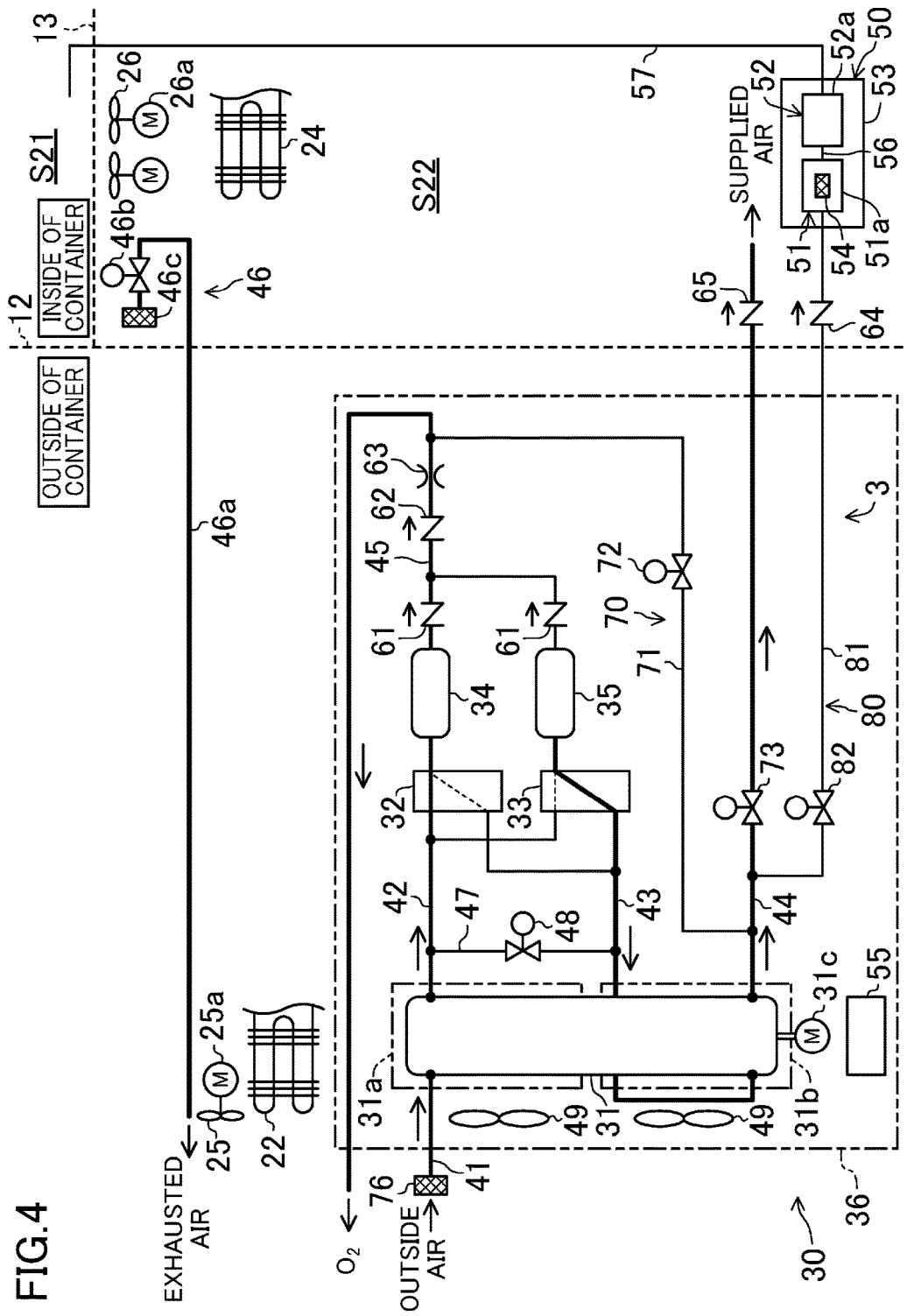
FIG. 4 is a piping diagram illustrating a configuration of a CA system in the container refrigeration apparatus of the first embodiment, together with the flow of air during a first operation.

As shown in FIG. 4, the CA system (60) includes a gas supply device (30), an exhaust portion (46), a sensor unit (50), and a controller (55), and controls the oxygen concentration and carbon dioxide concentration of the air in the container (11). The term "concentration" to be used in the following description always indicates a "volumetric concentration."

[Gas Supply Device]

—Configuration of Gas Supply Device—

The gas supply device (30) produces nitrogen-enriched air with a low oxygen concentration to be supplied into the container (11). In this embodiment, the gas supply device (30) is comprised of a vacuum pressure swing adsorption (VPSA)-type device. Further, the gas supply device (30) is disposed at the lower left corner of the external storage space (S1), as shown in FIG. 1.

As shown in FIG. 4, the gas supply device (30) includes an air circuit (3) connecting together an air pump (31), first and second directional control valves (32) and (33), and first and second adsorption columns (34) and (35) each provided with an adsorbent for adsorbing a nitrogen component in the air, and a unit case (36) housing these components of the air circuit (3). In this manner, the gas supply device (30) forms a single unit with these components housed in the unit case (36), and is configured to be retrofitted to the container refrigeration apparatus (10).

(Air Pump)

The air pump (31) is provided in the unit case (36), and includes a first pump mechanism (a pressurizing portion) (31a) and a second pump mechanism (a depressurizing portion) (31b), each of which sucks and compresses the air and discharges compressed air. The first and second pump mechanisms (31a) and (31b) are connected to a driving shaft of a motor (31*c*), and are driven in rotation by the motor (31*c*) to suck and compress the air, and discharge the compressed air.

One end of an outside air passage (41) which is arranged to pass through the unit case (36) from the interior to exterior of the unit case (36) is connected to the inlet of the first pump mechanism (31*a*). An air-permeable, waterproof membrane filter (76) is provided at the other end of the outside air passage (41). The outside air passage (41) is made of a flexible tube. Although not shown in the drawings, the other end of the outside air passage (41) where the membrane filter (76) is provided is arranged in the second space (S12) of the external storage space (S1) above the condenser (22). Due to this configuration, the first pump mechanism (31*a*) sucks and compresses the outside air from which moisture has been removed while flowing from the outside to inside of the unit case (36) through the membrane filter (76) provided at the other end of the outside air passage (41). On the other hand, an outlet of the first pump mechanism (31*a*) is connected to one end of a discharge passage (42). The other end (downstream end) of the discharge passage (42) is divided into two branches, which are connected to the first directional control valve (32) and the second directional control valve (33), respectively.

An inlet of the second pump mechanism (31*b*) is connected to one end of a suction passage (43). The other end (upstream end) of the suction passage (43) is divided into two branches, which are connected to the first and second directional control valves (32) and (33), respectively. An outlet of the second pump mechanism (31*b*) is connected to one end of a supply passage (44). The other end of the supply passage (44) opens in the secondary space (S22) on the blowout side of the internal fans (26) in the internal storage space (S2) of the container (11). The supply passage (44) is provided with a check valve (65) at the other end portion thereof. The check valve (91) allows the air to flow only from one end to the other end of the supply passage (44) and prevents backflow of the air.

In this embodiment, the discharge passage (42) and the suction passage (43) are connected via a bypass passage (47). The bypass passage (47) is provided with a bypass on-off valve (48), an opening/closing operation of which is controlled by the controller (55).

The first and second pump mechanisms (31*a*) and (31*b*) of the air pump (31) are configured as oil-free pumps without lubricant oil. Two blower fans (49) are disposed on the side of the air pump (31) to cool the air pump (31) by blowing air toward the air pump (31).

(Directional Control Valve)

The first and second directional control valves (32) and (33) are provided in the air circuit (3) between the air pump (31) and the first and second absorption columns (34) and (35), and switches the connection between the air pump (31) and the first and second absorption columns (34) and (35) among three connection states described later (first to third connection states). The controller (55) controls the switching.

Specifically, the first directional control valve (32) is connected to the discharge passage (42) connected to the outlet of the first pump mechanism (31*a*), the suction passage (43) connected to the inlet of the second pump mechanism (31*b*), and one end portion of the first adsorption column (34) (functioning as an inlet during pressurization). The first directional control valve (32) switches between a first state where the first adsorption column (34) is allowed to communicate with the outlet of the first pump mechanism (31*a*) to be blocked from the inlet of the second pump mechanism (31*b*) (the state shown in FIG. 4), and a second state where the first adsorption column (34) is allowed to communicate with the inlet of the second pump mechanism (31*b*) to be blocked from the outlet of the first pump mechanism (31*a*) (the state shown in FIG. 5).

The second directional control valve (33) is connected to the discharge passage (42) connected to the outlet of the first pump mechanism (31*a*), the suction passage (43) connected to the inlet of the second pump mechanism (31*b*), and one end portion of the second adsorption column (35) (functioning as an inlet during pressurization). The second directional control valve (33) switches between a first state where the second adsorption column (35) is allowed to communicate with the inlet of the second pump mechanism (31*b*) to be blocked from the outlet of the first pump mechanism (31*a*) (the state shown in FIG. 4), and a second state where the second adsorption column (35) is allowed to communicate with the outlet of the first pump mechanism (31*a*) to be blocked from the inlet of the second pump mechanism (31*b*) (the state shown in FIG. 5).

If the first and second directional control valves (32) and (33) are set to be the first state, the air circuit (3) is switched to the first connection state where the outlet of the first pump mechanism (31*a*) is connected to the first adsorption column (34), and the inlet of the second pump mechanism (31*b*) is connected to the second adsorption column (35) (see FIG. 4). In this state, an adsorption operation is performed on the first adsorption column (34) to adsorb a nitrogen component in the outside air onto the adsorbent, and a desorption operation is performed on the second adsorption column (35) to desorb the nitrogen component adsorbed onto the adsorbent.

Figure 5:
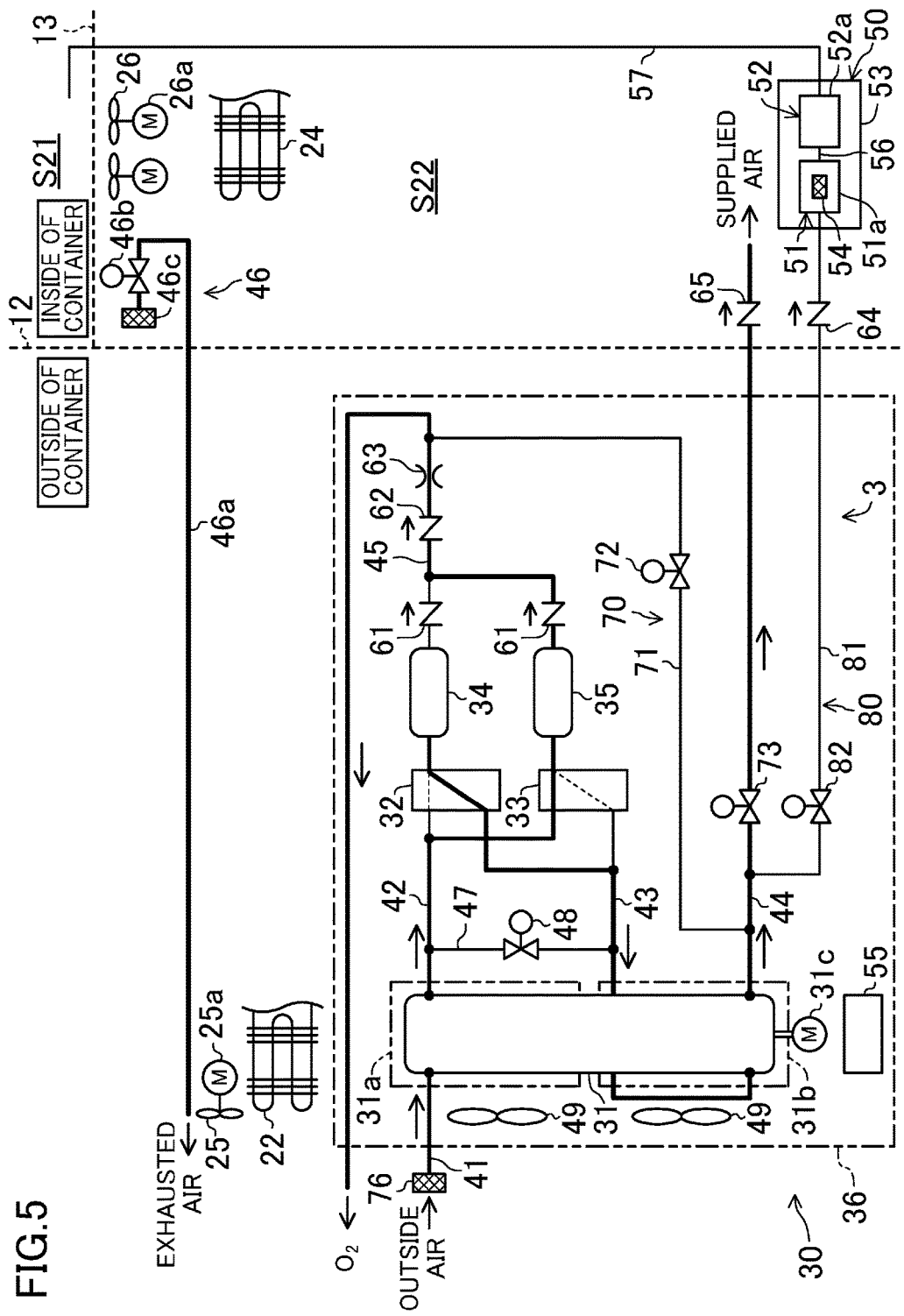
FIG. 5 is a piping diagram illustrating a configuration of the CA system in the container refrigeration apparatus of the first embodiment, together with the flow of air during a second operation.

If the first and second directional control valves (32) and (33) are set to be the second state, the air circuit (3) is switched to the second connection state where the outlet of the first pump mechanism (31*a*) is connected to the second adsorption column (35), and the inlet of the second pump mechanism (31*b*) is connected to the first adsorption column (34) (see FIG. 5). In this state, the adsorption operation is performed on the second adsorption column (35), and the desorption operation is performed on the first adsorption column (34).

Figure 6:
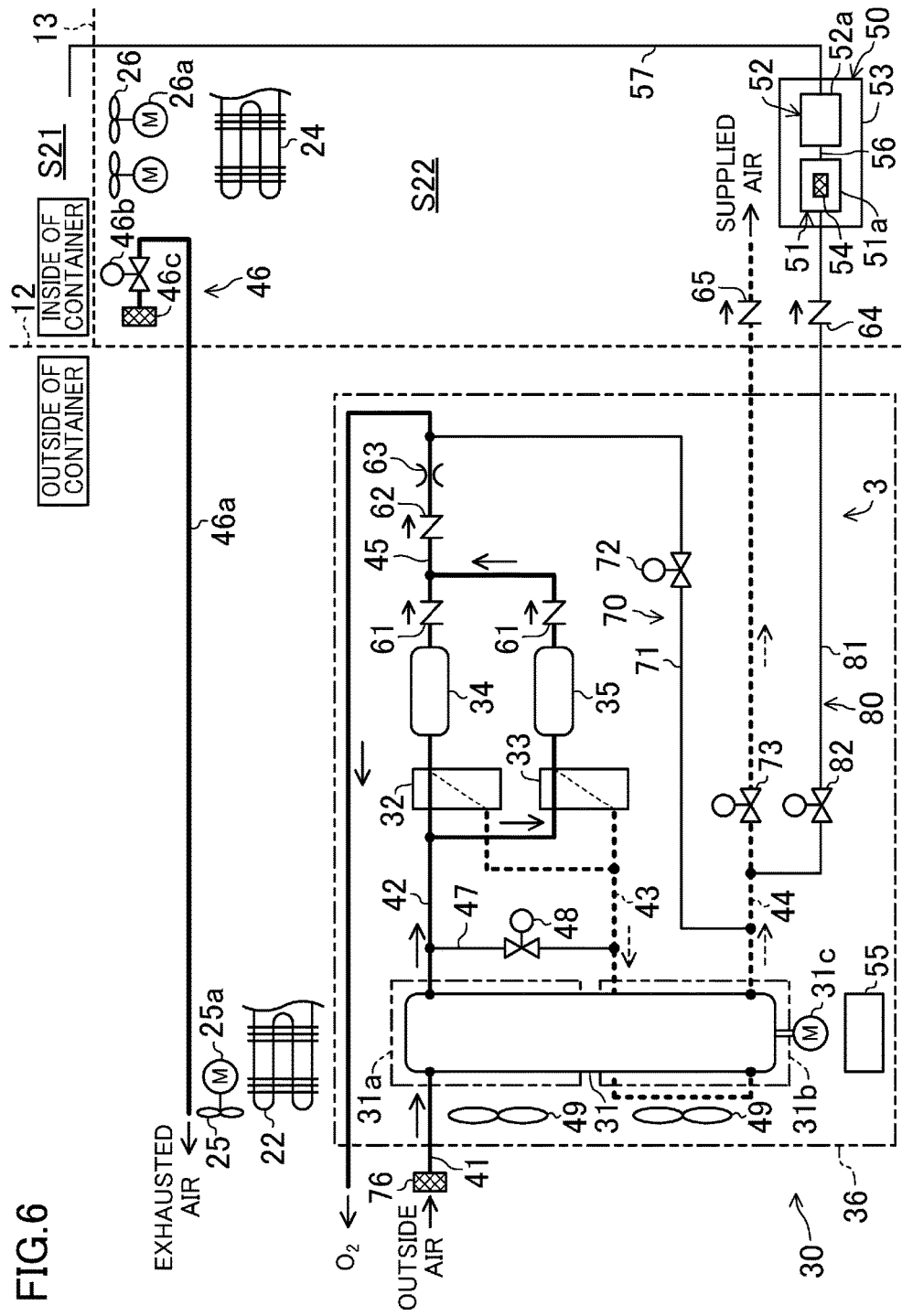
FIG. 6 is a piping diagram illustrating a configuration of the CA system in the container refrigeration apparatus of the first embodiment, together with the flow of air during a pressure equalization operation.

If the first directional control valve (32) is set to be the first state and the second directional control valve (33) is set to be the second state, the air circuit (3) is switched to the third connection state where the outlet of the first pump mechanism (31*a*) is connected to the first adsorption column (34), and the outlet of the first pump mechanism (31*a*) is connected to the second adsorption column (35) (see FIG. 6). In this state, both of the first and second adsorption columns (34) and (35) are connected to the outlet of the first pump mechanism (31*a*), and compressed outside air is supplied from the first pump mechanism (31*a*) to both of the first and second adsorption columns (34) and (35). In this state, the adsorption operation is performed on both of the first and second adsorption columns (34) and (35).

(Adsorption Column)

The first and second adsorption columns (34) and (35) are configured as cylindrical members filled with an adsorbent. The adsorbent that fills the first and second adsorption columns (34) and (35) adsorbs a nitrogen component in a state where the adsorption columns (34, 35) are pressurized, and desorbs the nitrogen component in a state where these adsorption columns (34, 35) are depressurized.

The adsorbent that fills the first and second adsorption columns (34) and (35) may be comprised of porous zeolite having pores with a diameter smaller than the diameter of nitrogen molecules (3.0 angstrom) and larger than the diameter of oxygen molecules (2.8 angstrom), for example. The nitrogen component in the air may be adsorbed using zeolite having pores of such a diameter as the adsorbent.

Cations exist in the pores of zeolite, and thus an electric field has been generated to cause polarity. Therefore, zeolite has the property of adsorbing polarity molecules such as water molecules. As a result, the adsorbent made of zeolite and filling the first and second adsorption columns (34) and (35) adsorbs not only nitrogen but also moisture (vapor) in the air. The moisture adsorbed onto the adsorbent is desorbed from the adsorbent together with the nitrogen component as a result of the desorption operation. Consequently, nitrogen-enriched air including moisture is supplied into the container (11), thus increasing the humidity in the container (11). Furthermore, the adsorbent is regenerated, which may extend the adsorbent's life.

In this configuration, if the air pump (31) supplies compressed outside air to the first and second adsorption columns (34) and (35) to pressurize these columns (34) and (35), the nitrogen component in the outside air is adsorbed onto the adsorbent. This produces oxygen-enriched air that has had its nitrogen concentration lowered and oxygen concentration increased by including less nitrogen component than the outside air does. On the other hand, if the air pump (31) sucks the air from the first and second adsorption columns (34) and (35) to depressurize these columns (34) and (35), the nitrogen component adsorbed onto the adsorbent is desorbed. This produces nitrogen-enriched air that has had its nitrogen concentration increased and oxygen concentration lowered by including more nitrogen component than the outside air does. In this embodiment, the nitrogen-enriched air of 92% nitrogen and 8% oxygen, for example, is produced.

The respective other ends of the first and second adsorption columns (34) and (35) (functioning as outlets during pressurization) are connected to one end of an oxygen discharge passage (45) through which the oxygen-enriched air that has been produced in the first and second adsorption columns (34) and (35) from the compressed outside air supplied by the first pump mechanism (31a) is guided toward the outside of the container (11). The one end of the oxygen discharge passage (45) is divided into two branches, which are connected to the other ends of the first and second adsorption columns (34) and (35), respectively. The other end of the oxygen discharge passage (45) opens outside the gas supply device (30), i.e., outside the container (11). The branches of the oxygen discharge passage (45) are connected to the other ends of the first and second adsorption columns (34) and (35), respectively. Each of the junction portions is provided with a check valve (61) which prevents backflow of the air from the oxygen discharge passage (45) toward the first and second adsorption columns (34) and (35).

A check valve (62) and an orifice (63) are arranged at some midpoints of the oxygen discharge passage (45) so as to be sequentially arranged from one end to the other end of the oxygen discharge passage (45). The check valve (62) prevents backflow of the nitrogen-enriched air from an exhaust connection passage (71), which will be described later, toward the first and second adsorption columns (34) and (35). The orifice (63) depressurizes the oxygen-enriched air which has flowed out of the first and second adsorption columns (34) and (35) before the oxygen-enriched air is discharged to the outside of the container.

(Supply-Discharge Switching Mechanism)

The air circuit (3) is provided with a supply-discharge switching mechanism (70) which switches between a gas supply operation, which will be described later (see FIGS. 4 and 5), of supplying the produced nitrogen-enriched air into the container (11), and a gas discharge operation (see FIG. 7) of discharging the produced nitrogen-enriched air to the outside of the container (11). The supply-discharge switching mechanism (70) includes an exhaust connection passage (71), an exhaust on-off valve (72), and a supply on-off valve (73).

The exhaust connection passage (71) has one end connected to the supply passage (44), and the other end connected to the oxygen discharge passage (45). The other end of the exhaust connection passage (71) is connected to the oxygen discharge passage (45) so as to be located further toward the outside of the container than the orifice (63).

The exhaust on-off valve (72) is provided at the exhaust connection passage (71). The exhaust on-off valve (72) is provided at a midpoint of the exhaust connection passage (71), and is comprised of a solenoid valve which is switched between an open state where the flow of the nitrogen-enriched air from the supply passage (44) is allowed, and a closed state where the flow of the nitrogen-enriched air is blocked. The controller (55) controls an opening/closing operation of the exhaust on-off valve (72).

The supply on-off valve (73) is provided at the supply passage (44) so as to be located further toward the other end (toward the inside of the container) than the junction where the exhaust connection passage (71) is connected. The supply on-off valve (73), which is located further toward the inside of the container than the junction where the exhaust connection passage (71) is connected, is comprised of a solenoid valve which is switched between an open state where the flow of the nitrogen-enriched air toward the inside of the container is allowed, and a closed state where the flow of the nitrogen-enriched air toward the inside of the container is blocked. The controller (55) controls an opening/closing operation of the exhaust on-off valve (73).

(Measurement Unit)

Figure 8:
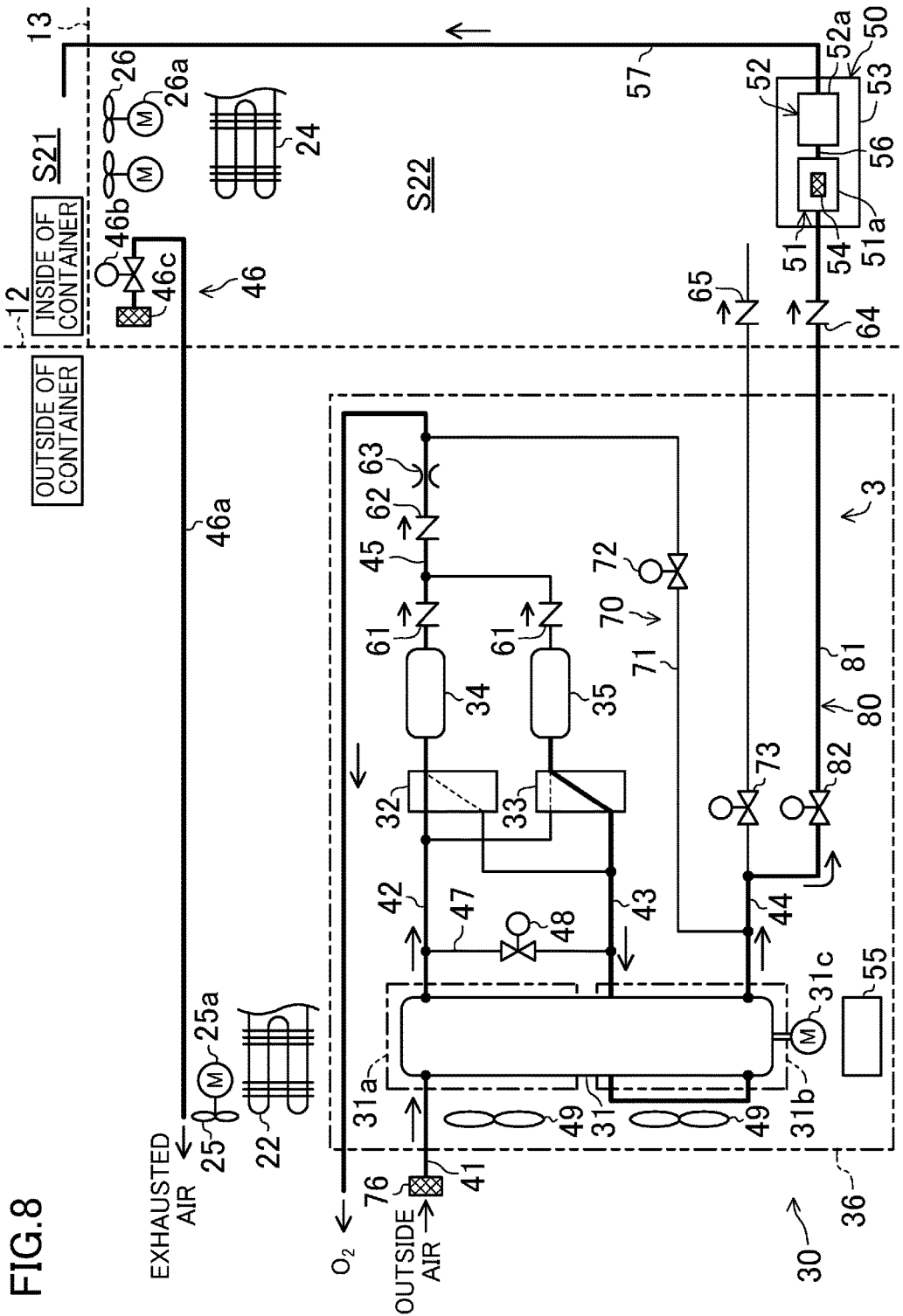
FIG. 8 is a piping diagram illustrating a configuration of the CA system in the container refrigeration apparatus of the first embodiment, together with the flow of air during a supply air measurement operation.

The air circuit (3) is provided with a measurement unit (80) for performing a supply air measurement operation (see FIG. 8) to measure the concentration of the produced nitrogen-enriched air using a sensor unit (50) provided in the container (11), which will be described later. The measurement unit (80) includes a branch pipe (a measurement passage) (81) and a measurement on-off valve (82), and allows part of the nitrogen-enriched air flowing through the supply passage (44) to be diverged toward the oxygen sensor (51).

Specifically, the branch pipe (81) has one end connected to the supply passage (44), and the other end coupled to an oxygen sensor box (51a), which will be described later, of the oxygen sensor (51). In this embodiment, the branch pipe (81) is branched from the supply passage (44) in the unit case (36) and extends from the interior to exterior of the unit case (36).

The measurement on-off valve (82) is provided for the branch pipe (81) in the unit case. The measurement on-off valve (82) is comprised of a solenoid valve which switches between an open state where the flow of the nitrogen-enriched air in the branch pipe (81) is allowed, and a closed state where the flow of the nitrogen-enriched air in the branch pipe (81) is blocked. The controller (55) controls an opening/closing operation of the measurement on-off valve (82). As will be described in detail later, the measurement on-off valve (82) is open only when a supply air measurement operation to be described later is performed, and is closed in the other modes.

—Operation of Gas Supply Device—

(Gas Production Operation)

The gas supply device (30) alternately repeats a first operation (see FIG. 4) in which the first adsorption column (34) is pressurized and the second adsorption column (35) is depressurized simultaneously, and a second operation (see FIG. 5) in which the first adsorption column (34) is depressurized and the second adsorption column (35) is pressurized simultaneously every predetermined time (e.g., 14.5 seconds) so as to produce the nitrogen-enriched air and the oxygen-enriched air. In this embodiment, a pressure equalization operation (see FIG. 6) in which both of the first and second adsorption columns (34) and (35) are pressurized is performed for a predetermined time (e.g., 1.5 seconds) between the first and second operations (see FIG. 9). The controller (55) controls the first and second directional control valves (32) and (33) to perform the switching among these operations.

«First Operation»

During the first operation, the controller (55) switches the first and second directional control valves (32) and (33) to the first state shown in FIG. 4. Thus, the air circuit (3) is set to the first connection state in which the first adsorption column (34) communicates with the outlet of the first pump mechanism (31*a*) and is blocked from the inlet of the second pump mechanism (31*b*), and simultaneously, the second adsorption column (35) communicates with the inlet of the second pump mechanism (31*b*) and is blocked from the outlet of the first pump mechanism (31*a*).

The first pump mechanism (31*a*) supplies the compressed outside air to the first adsorption column (34). A nitrogen component contained in the air that has flowed into the first adsorption column (34) is adsorbed on the adsorbent of the first adsorption column (34). Thus, during the first operation, the first pump mechanism (31*a*) supplies the compressed outside air to the first adsorption column (34), in which the adsorbent adsorbs the nitrogen component in the outside air. As a result, oxygen-enriched air having a lower nitrogen concentration and a higher oxygen concentration than the outside air is produced. The oxygen-enriched air flows from the first adsorption column (34) to the oxygen discharge passage (45).

On the other hand, the second pump mechanism (31*b*) sucks the air from the second adsorption column (35). Simultaneously, the second pump mechanism (31*b*) also sucks the nitrogen component that has been adsorbed onto the adsorbent in the second adsorption column (35) together with the air, thereby allowing the adsorbent to desorb the nitrogen component. Thus, during the first operation, the second pump mechanism (31*b*) sucks the air out of the second adsorption column (35) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31*b*), compressed, and discharged toward the supply passage (44).

«Second Operation»

In the second operation, the controller (55) switches the first and second directional control valves (32) and (33) to the second state shown in FIG. 5. Thus, the air circuit (3) is set to the second connection state where the first adsorption column (34) communicates with the inlet of the second pump mechanism (31*b*) and is blocked from the outlet of the first pump mechanism (31*a*), and simultaneously, the second adsorption column (35) communicates with the outlet of the first pump mechanism (31*a*) and is blocked from the inlet of the second pump mechanism (31*b*).

The first pump mechanism (31*a*) supplies the compressed outside air to the second adsorption column (35). A nitrogen component contained in the air which has flowed into the second adsorption column (35) is adsorbed on the adsorbent of the second adsorption column (35). Thus, during the second operation, the first pump mechanism (31*a*) supplies the compressed outside air to the second adsorption column (35), in which the adsorbent adsorbs the nitrogen component in the outside air. This produces oxygen-enriched air having a lower nitrogen concentration and a higher oxygen concentration than the outside air. The oxygen-enriched air flows from the second adsorption column (35) to the oxygen discharge passage (45).

On the other hand, the second pump mechanism (31*b*) sucks the air from the first adsorption column (34). Simultaneously, the second pump mechanism (31*b*) also sucks the nitrogen component that has been adsorbed onto the adsorbent in the first adsorption column (34) together with the air, thereby allowing the adsorbent to desorb the nitrogen component. Thus, during the second operation, the second pump mechanism (31*b*) sucks the air out of the first adsorption column (34) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31*b*), compressed, and discharged toward the supply passage (44).

«Pressure Equalization Operation»

As illustrated in FIG. 6, in the pressure equalization operation, the controller (55) switches the first directional control valve (32) to the first state, and the second directional control valve (33) to the second state. Thus, the air circuit (3) is set to the third connection state where both of the first and second adsorption columns (34) and (35) communicate with the outlet of the first pump mechanism (31*a*) and are blocked from the inlet of the second pump mechanism (31*b*).

The first pump mechanism (31*a*) supplies the compressed outside air to both of the first and second adsorption columns (34) and (35). The nitrogen component contained in the compressed air which has flowed into the first and second adsorption columns (34) and (35) is adsorbed onto the adsorbent in each of the columns (34) and (35), and the oxygen-enriched air is produced. The oxygen-enriched air flows from the first and second adsorption columns (34) and (35) to the oxygen discharge passage (45).

On the other hand, the second pump mechanism (31*b*) is blocked from the first and second adsorption columns (34) and (35). Thus, in the pressure equalization operation, no further nitrogen-enriched air is produced in the first and second adsorption columns (34) and (35). The second pump mechanism (31*b*) sucks and compresses the nitrogen-enriched air remaining in the suction passage (43), and discharges the compressed nitrogen-enriched air into the supply passage (44).

As mentioned above, in the first operation, the first adsorption column (34) is pressurized by the first pump mechanism (31*a*) to perform the adsorption operation, whereas the second adsorption column (35) is depressurized by the second pump mechanism (31*b*) to perform the desorption operation. On the other hand, in the second operation, the second adsorption column (35) is pressurized by the first pump mechanism (31*a*) to perform the adsorption operation, whereas the first adsorption column (34) is depressurized by the second pump mechanism (31*b*) to perform the desorption operation. Thus, when the first operation is switched to the second operation or the second operation is switched to the first operation without the pressure equalization operation performed between the first and second operations, the pressure in the adsorption column where the desorption operation has been performed before the switching is remarkably low right after the switching. Thus, it takes time until the pressure in this adsorption column increases, and the adsorption operation does not start soon.

Thus, in this embodiment, the air circuit (3) is switched to the third connection state when the first operation is switched to the second operation and when the second operation is switched to the first operation, so that the first and second adsorption columns (34) and (35) communicate with each other via the first and second directional control valves (32) and (33). In this configuration, the internal pressures of the first and second adsorption columns (34) and (35) are immediately equalized (i.e., become intermediate pressures between the respective inner pressures). The pressure equalization operation immediately increases the pressure in the adsorption column which has been depressurized by the second pump mechanism (31*b*) and performing the desorption operation before the switching. Thus, the adsorption operation is performed immediately after the connection with the first pump mechanism (31*a*).

In this manner, the gas supply device (30) alternately repeats the first and second operations, with the pressure equalization operation performed between the first and second operations, thereby producing the nitrogen-enriched air and the oxygen-enriched air in the air circuit (3).

(Gas Supply Operation/Gas Discharge Operation)

The supply-discharge switching mechanism (70) switches the gas supply device (30) between a gas supply operation in which the nitrogen-enriched air produced in the air circuit (3) is supplied into the container (11), and a gas discharge operation in which the produced nitrogen-enriched air is not supplied into, but discharged to the outside of, the container (11) for a predetermined time since the desorption operation was started.

«Gas Supply Operation»

During the gas supply operation, the controller (55) closes the exhaust on-off valve (72), and opens the supply on-off valve (73). As a result, the nitrogen-enriched air produced alternately in the first and second adsorption columns (34) and (35) is supplied into the container (11) through the supply passage (44), and the oxygen-enriched air is discharged to the outside of the container through the oxygen discharge passage (45).

«Gas Discharge Operation»

Figure 7:
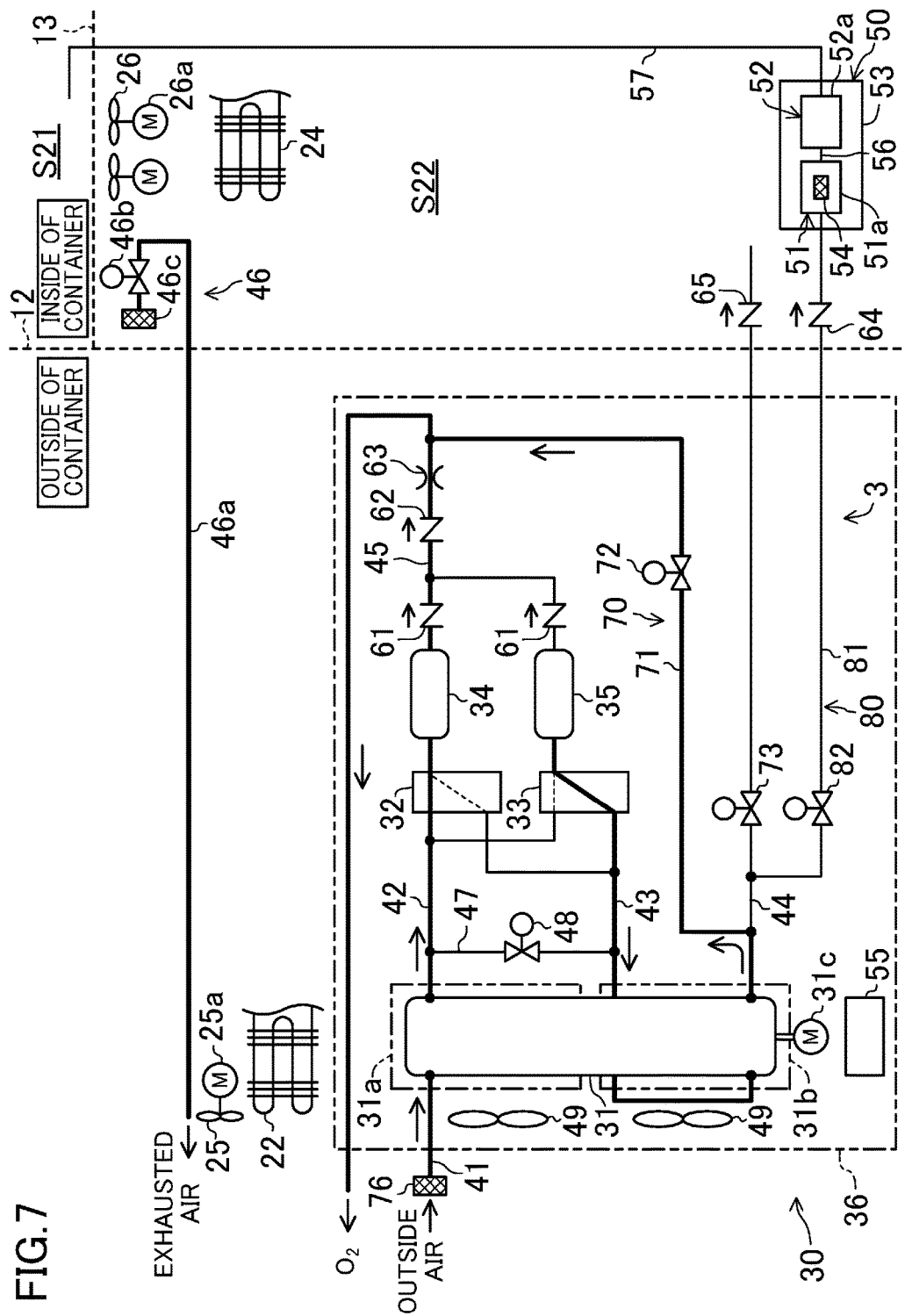
FIG. 7 is a piping diagram illustrating a configuration of the CA system in the container refrigeration apparatus of the first embodiment, together with the flow of air during a gas discharge operation.

During the gas discharge operation, as shown in FIG. 7, the controller (55) opens the exhaust on-off valve (72), and closes the supply on-off valve (73). As a result, the nitrogen-enriched air produced alternately in the first and second adsorption columns (34) and (35) is not allowed to flow further toward the inside of the container (11) than the supply on-off valve (73) in the supply passage (44), and flows into the exhaust connection passage (71). The nitrogen-enriched air that has flowed into the exhaust connection passage (71) flows into the oxygen discharge passage (45), and is discharged to the outside of the container together with the oxygen-enriched air flowing through the oxygen discharge passage (45).

[Exhaust Portion]

—Configuration of Exhaust Portion—

As shown in FIG. 2, the exhaust portion (46) includes an exhaust passage (46*a*) connecting the internal storage space (S2) and the exterior space of the container together, an exhaust valve (46*b*) connected to the exhaust passage (46*a*), and a membrane filter (46*c*) provided at an inlet end (an end located inside the container) of the exhaust passage (46*a*). The exhaust passage (46*a*) passes through the casing (12) from the interior to exterior of the casing (12). The exhaust valve (46*b*) is provided adjacent to an internal end of the exhaust passage (46*a*), and is comprised of a solenoid valve which is switched between an open state where the flow of the air in the exhaust passage (46*a*) is allowed, and a closed state where the flow of the air in the exhaust passage (46*a*) is blocked. The controller (55) controls an opening/closing operation of the exhaust valve (46*b*).

—Operation of Exhaust Portion—

When the external fan (25) is rotating, an exhaust operation is performed. That is, the controller (55) opens the exhaust valve (46*b*) to discharge the air (inside air) in the internal storage space (S2) communicating with the interior of the container to the outside of the container.

Specifically, when the external fan (25) is rotating, the pressure of the secondary space (S22) on the blowout side becomes higher than the pressure of the exterior space of the container (i.e., the atmospheric pressure). Thus, when the exhaust valve (46*b*) is open, due to the pressure difference between the ends of the exhaust passage (46*a*) (the pressure difference between the external space of the container and the secondary space (S22)), the air in the internal storage space (S2) communicating with the interior of the container (inside air) is discharged to the outside of the container via the exhaust passage (46*a*).

[Sensor Unit]

—Configuration of Sensor Unit—

As shown in FIG. 2, the sensor unit (50) is provided in the secondary space (S22) on the blowout side of the internal fans (26) in the internal storage space (S2). The sensor unit (50) includes an oxygen sensor (51), a carbon dioxide sensor (52), a fixing member (53), a membrane filter (54), a connection pipe (56), and an exhaust pipe (57).

The oxygen sensor (51) has an oxygen sensor box (51*a*) housing a galvanic-cell sensor therein. The oxygen sensor (51) measures the value of a current flowing through an electrolytic solution of the galvanic cell-type sensor to measure the oxygen concentration of a gas in the oxygen sensor box (51*a*). An outer surface of the oxygen sensor box (51*a*) is fixed to the fixing member (53). Another outer surface of the oxygen sensor box (51*a*) opposite from the outer surface fixed to the fixing member (53) has an opening, to which the membrane filter (54), which is air-permeable and waterproof, is attached. In addition, one end of the connection pipe (56) is coupled via a connector to one of the side surfaces of the oxygen sensor box (51*a*). Further, a branch pipe (81) of a measurement unit (80) is coupled via a connector (pipe joint) to a lower surface of the oxygen sensor box (51*a*).

The carbon dioxide sensor (52) has a carbon dioxide sensor box (52*a*). The carbon dioxide sensor (52) is a non-dispersive infrared sensor which radiates infrared rays to the gas in the carbon dioxide sensor box (52*a*) to measure an absorption amount of infrared rays having a wavelength specific to carbon dioxide, thereby measuring the carbon dioxide concentration in the gas. The other end of the connection pipe (56) is coupled via a connector to one side surface of the carbon dioxide sensor box (52a). Furthermore, one end of the exhaust pipe (57) is coupled via a connector to the other side surface of the carbon dioxide sensor box (52a).

The fixing member (53) is fixed to the casing (12) with the oxygen sensor (51) and the carbon dioxide sensor (52) attached thereto.

The connection pipe (56) is, as described above, coupled to the one side surface of the oxygen sensor box (51a) and the one side surface of the carbon dioxide sensor box (52a), and allows the internal space of the oxygen sensor box (51a) to communicate with the internal space of the carbon dioxide sensor box (52a).

As described above, the exhaust pipe (57) has one end coupled to the other side surface of the carbon dioxide sensor box (52a), and the other end open near the suction port of the internal fans (26). That is, the exhaust pipe (57) allows the internal space of the carbon dioxide sensor box (52a) to communicate with the primary space (S21) of the internal storage space (S2).

—Concentration Measurement Operation—

As can be seen, the secondary and primary spaces (S22) and (S21) of the internal storage space (S2) communicate with each other via an air passage (58) formed by the membrane filter (54), the internal space of the oxygen sensor box (51a), the connection pipe (56), the internal space of the carbon dioxide sensor box (52a), and the exhaust pipe (57). Thus, when the internal fans (26) are rotating, the pressure of the primary space (S21) becomes lower than the pressure of the secondary space (S22). Due to this pressure difference, the air in the container flows from the secondary space (S22) to the primary space (S21) in the air passage (58) to which the oxygen sensor (51) and the carbon dioxide sensor (52) are connected. Thus, the air sequentially flows from the interior of the container to the oxygen sensor (51) and the carbon dioxide sensor (52), and then the oxygen concentration of the air is measured by the oxygen sensor (51), and the carbon dioxide concentration of the air is measured by the carbon dioxide sensor (52).

[Controller]

The controller (55) is configured to perform a concentration control operation for controlling the oxygen concentration and carbon dioxide concentration of the air in the container (11) to desired concentrations, respectively. Specifically, the controller (55) controls the operation of the gas supply device (30) and the exhaust portion (46) based on measurement results obtained by the oxygen sensor (51) and the carbon dioxide sensor (52) so that the oxygen concentration and carbon dioxide concentration of the air in the container (11) are controlled to desired target concentrations (e.g., 3% oxygen and 5% carbon dioxide). Specifically, the controller (55) is configured to execute a first operation mode (whole supply operation, see FIG. 10), a second operation mode (partial supply operation, see FIG. 11), and a stop mode. In each of the first and second operation modes, a gas production operation (see FIG. 9), a gas supply operation (see FIGS. 4 to 6), and a gas discharge operation (see FIG. 7) by the gas supply device (30) are performed in combination with an exhaust operation by the exhaust portion (46). In the stop mode, the operations by the gas supply device (30) and the exhaust portion (46) are all stopped.

In addition, the controller (55) is configured to control the operation of the measurement on-off valve (82) in accordance with a command entered by a user or periodically so as to perform a supply air measurement operation of measuring the oxygen concentration of the nitrogen-enriched air produced by the gas supply device (30).

The controller (55) of this embodiment includes a microcomputer which controls various components of the CA system (60) in such a manner as disclosed in this application, a memory or a hard disk which stores control programs that can be executed. Note that the controller (55) is an example of a controller of the CA system (60), and a detailed structure and algorithm of the controller (55) may be comprised of a combination of any kind of hardware and software that can implement the functions of the present invention.

—Operation—

<Operation of Refrigerant Circuit>

In this embodiment, a unit controller (100) shown in FIG. 3 performs a cooling operation for cooling the air in the container (11).

During the cooling operation, the unit controller (100) controls the operation of the compressor (21), the expansion valve (23), the external fan (25), and the internal fans (26) such that the temperature of the air in the container reaches a desired target temperature based on measurement results provided by a temperature sensor (not shown). In this case, the refrigerant circuit (20) allows the refrigerant to circulate to perform a vapor compression refrigeration cycle. Then, the air in the container (11) guided to the internal storage space (S2) by the internal fans (26) is cooled when passing through the evaporator (24) by the refrigerant flowing through the evaporator (24). The air in the container cooled by the evaporator (24) passes through the underfloor path (19a), and is blown again into the container (11) via the blowout port (18b). Thus, the air in the container (11) is cooled.

<Concentration Control Operation>

In this embodiment, the controller (55) shown in FIG. 4 instructs the CA system (60) to perform a concentration control operation of controlling the composition of the air in the container (11) (oxygen concentration and carbon dioxide concentration) to a desired composition (e.g., 3% oxygen and 5% carbon dioxide). In the concentration control operation, the controller (55) controls the operation of the gas supply device (30) and the exhaust portion (46) based on the measurement results obtained by the oxygen sensor (51) and the carbon dioxide sensor (52) so that the composition of the air in the container (11) will be a desired composition.

During the concentration control operation, the controller (55) instructs the measurement on-off valve (82) to close. Further, during the concentration control operation, the controller (55) communicates with the unit controller (100) to instruct the unit controller (100) to rotate the internal fans (26). Thus, the air in the container is supplied to the oxygen sensor (51) and the carbon dioxide sensor (52) by the internal fans (26), and then the oxygen concentration and carbon dioxide concentration of the air in the container are measured.

(Control of Oxygen Concentration)

[First Operation Mode]

If the oxygen concentration of the air in the container measured by the oxygen sensor (51) is higher than 8%, the controller (55) executes the first operation mode.

In the first operation mode, the controller (55) alternately repeats the first and second operations, with the pressure equalization operation performed during intervals between the first and second operations, by switching the first and second directional control valves (32) and (33) as shown in FIG. 9, thereby producing nitrogen-enriched air having a higher nitrogen concentration and lower oxygen concentration than the outside air (gas production operation). In this embodiment, the operational time of the first and second operations is set to be 14.5 seconds each, and the operational time of the pressure equalization operation is set to be 1.5 seconds.

Further, in the first operation mode, the controller (55) instructs the exhaust on-off valve (72) to close and the supply on-off valve (73) to open as shown in FIGS. 4, 5, and 10 to perform the gas supply operation of supplying the nitrogen-enriched air produced in the gas production operation into the container (11).

Note that in each of the first and second operations, the nitrogen-enriched air produced in an initial stage of the operation and the nitrogen-enriched air produced in a terminal stage of the operation have different compositions. Specifically, in the initial stage of each operation, the nitrogen-enriched air having a relatively high oxygen concentration is produced because the outside air still remains in the adsorption columns and the pipes. In the terminal stage of each operation, the nitrogen-enriched air having a relatively low oxygen concentration is produced because the pressure in the adsorption columns becomes lower than that in the initial stage, and more nitrogen component is desorbed. In the first operation mode, the whole nitrogen-enriched air produced in the first and second operations is supplied into the container (11). As a result, the nitrogen-enriched air having a mean nitrogen concentration of 92% (i.e., a mean value of the nitrogen concentration of the nitrogen-enriched air supplied into the container in each of the first and second operations) and a mean oxygen concentration of 8% (i.e., a mean value of the oxygen concentration of the nitrogen-enriched air supplied into the container in each of the first and second operations) is supplied into the container (11).

Further, in the first operation mode, the controller (55) instructs the exhaust valve (46b) of the exhaust portion (46) to open to perform the exhaust operation, so that the air in the container (11) is discharged to the exterior of the container only by the amount of the nitrogen-enriched air supplied to the interior of the container (11) during the gas supply operation.

In the first operation mode, the air in the container is replaced with the nitrogen-enriched air by the above-described gas supply operation and exhaust operation, thereby reducing the oxygen concentration of the air in the container.

[Second Operation Mode]

When the oxygen concentration of the air in the container (11) has decreased to 8% through the first operation mode, the controller (55) executes the second operation mode.

Also in the second operation mode, just like in the first operation mode, the controller (55) alternately repeats the first operation and the second operation, with the pressure equalization operation performed during the intervals between the first and second operations, by switching the first and second directional control valves (32) and (33) as shown in FIG. 9, thereby producing nitrogen-enriched air having a higher nitrogen concentration and lower oxygen concentration than the outside air (gas production operation).

In the second operation mode, the controller (55) instructs the exhaust on-off valve (72) to open and the supply on-off valve (73) to close as shown in FIGS. 7 and 11 for a predetermined time in the initial stage of the first and second operation modes (4 seconds from the start of each operation in this embodiment) to perform the gas discharge operation of discharging the nitrogen-enriched air produced in the gas production operation to the outside of the container (11) without supplying the nitrogen-enriched air into the container (11). Then, the controller (55) instructs the exhaust on-off valve (72) to close and the supply on-off valve (73) to open after the end of the gas discharge operation to perform the gas supply operation of supplying the nitrogen-enriched air produced in the gas production operation into the container (11).

In the second operation mode, the gas discharge operation is performed in the initial stage of the first and second operations to discharge the nitrogen-enriched air to the outside of the container without supplying it into the container. Thus, the nitrogen-enriched air having a relatively high oxygen concentration produced just after the start of the desorption operation is not supplied into the container (11). Consequently, nitrogen-enriched air having a mean nitrogen concentration of 95% and a mean oxygen concentration of 5% is supplied into the container (11). Thus, in the second operation mode, the nitrogen-enriched air having a lower oxygen concentration than the nitrogen-enriched air supplied into the container (11) in the first operation mode is supplied.

Further, also in the second operation mode, just like in the first operation mode, the controller (55) instructs the exhaust valve (46b) of the exhaust portion (46) to open to perform the exhaust operation, so that the air in the container (11) is discharged to the exterior of the container only by the amount of the nitrogen-enriched air supplied to the interior of the container (11) during the gas supply operation.

In the second operation mode, the gas discharge operation is performed first, and then the gas supply operation is performed, so that only the nitrogen-enriched air having a lower oxygen concentration than the nitrogen-enriched air supplied in the first operation mode is supplied into the container (11). Through the exhaust operation performed simultaneously with the gas discharge operation and the gas supply operation, the air in the container is replaced with the nitrogen-enriched air having a relatively low oxygen concentration (e.g., a mean oxygen concentration of 5%). Thus, the oxygen concentration of the air in the container (11) decreases.

[Stop Mode]

When the oxygen concentration of the air in the container (11) has decreased to 5% through the second operation mode, the controller (55) stops the operation of the gas supply device (30) to stop the gas supply operation, and closes the exhaust valve (46b) to stop the exhaust operation (stop mode).

When the gas supply operation and the exhaust operation are stopped, the air in the container (11) is no longer replaced, but the plants (15) keep breathing. Therefore, the oxygen concentration of the air in the container (11) decreases and the carbon dioxide concentration of the air in the container (11) increases. The oxygen concentration of the air in the container will eventually reach the target oxygen concentration of 3%.

If the oxygen concentration of the air in the container (11) falls below 3% due to the breathing, the controller (55) resumes the operation of the gas supply device (30) to execute the first operation mode. In the first operation mode, performed are the gas supply operation of supplying the nitrogen-enriched air having a mean oxygen concentration of 8% into the container (11), and the exhaust operation of exhausting the inside air to the exterior of the container only by the amount of the nitrogen-enriched air supplied into the container (11) during the gas supply operation. Through the gas supply operation and the exhaust operation, the air in the container is replaced with the nitrogen-enriched air having a higher oxygen concentration (e.g., a mean oxygen concentration of 5%) than the air in the container. Thus, the oxygen concentration of the air in the container (11) increases.

When the oxygen concentration of the inside air becomes higher than the target oxygen concentration (3%) only by a predetermined concentration (e.g., 0.5%), the controller (55) stops the operation of the gas supply device (30) to stop the gas supply operation, and closes the exhaust valve (46b) to stop the exhaust operation.

The oxygen concentration of the inside air may be controlled through an outside air introduction operation and the exhaust operation, instead of executing the first operation mode. In the outside air introduction operation, the bypass on-off valve (48) is opened to allow the outside air sucked into the air pump (31) to bypass the first and second adsorption columns (34, 35) and flow directly into the container (11). In the exhaust operation, the exhaust valve (46b) of the exhaust portion (46) is opened to exhaust the inside air to the exterior of the container only by the amount of the outside air supplied to the interior of the container (11) during the outside air introduction operation. Through the outside air introduction operation and the exhaust operation thus performed, the air in the container is replaced with the outside air having an oxygen concentration of 21%. Thus, the oxygen concentration of the air in the container (11) increases.

(Control of Carbon Dioxide Concentration)

If the carbon dioxide concentration of the air in the container measured by the carbon dioxide sensor (52) is higher than 5%, the controller (55) executes the first operation mode shown in FIG. 10. In the first operation mode, performed are the gas supply operation of supplying the nitrogen-enriched air having a mean nitrogen concentration of 92% and a mean oxygen concentration of 8% into the container (11), and the exhaust operation of exhausting the inside air to the exterior of the container only by the amount of the nitrogen-enriched air supplied to the interior of the container (11) during the gas supply operation. Through the gas supply operation and the exhaust operation thus performed, the air in the container is replaced with the nitrogen-enriched air having a carbon dioxide concentration of 0.03%. Thus, the carbon dioxide concentration of the air in the container (11) is lowered.

When the carbon dioxide concentration of the air in the container becomes 4.5%, which is lower than the target carbon dioxide concentration (5%) only by a predetermined concentration (e.g., 0.5%), the controller (55) stops the operation of the gas supply device (30) to stop the gas supply operation, and closes the exhaust valve (46b) to stop the exhaust operation.

The carbon dioxide concentration of the air in the container may also be controlled through the outside air introduction operation with the bypass on-off valve (48) open, instead of the gas supply operation. Through the outside air introduction operation and the exhaust operation thus performed, the air in the container is replaced with the outside air having a carbon dioxide concentration of 0.03%. Thus, the carbon dioxide concentration of the air in the container (11) is lowered.

[Supply Air Measurement Operation]

The controller (55) also performs a supply air measurement operation of measuring the oxygen concentration of the nitrogen-enriched air produced in the gas supply device (30) in accordance with a command entered by a user or periodically (e.g., every ten days). Note that the supply air measurement operation is performed concurrently when the internal fans (26) are stopped during a gas supply operation for the concentration control operation described above or test run.

During the gas supply operation, the controller (55) opens the measurement on-off valve (82), and closes the supply on-off valve (73). As a result, all the nitrogen-enriched air flowing through the supply passage (44) flows into the branch pipe (81). The nitrogen-enriched air that has flowed into the branch pipe (81) flows into the oxygen sensor box (51a) of the oxygen sensor (51), which then measures the oxygen concentration.

In this manner, whether the composition (oxygen concentration and nitrogen concentration) of the nitrogen-enriched air produced in the gas supply device (30) is a desired composition or not can be determined by the measurement of the oxygen concentration of the nitrogen-enriched air produced in the gas supply device (30).

Advantages of First Embodiment

As can be seen in the foregoing, according to the first embodiment, the CA system (60) executes the second operation mode (partial supply operation) in which the nitrogen-enriched air produced for a predetermined time since the desorption operation was started is not supplied into, but discharged to the outside of, the container (11), and then only the nitrogen-enriched air produced until the end of the desorption operation since the predetermined time passed is supplied into the container (11). Through this second operation mode (partial supply operation), the nitrogen-enriched air having a relatively high oxygen concentration produced in the initial stage of the desorption operation is not supplied into, but discharged to the outside of, the container (11). Thus, only the nitrogen-enriched air which is produced after the outside air remaining in the adsorption columns (34, 35) and the pipes has been discharged and has a relatively low oxygen concentration can be supplied into the container (11). Thus, this CA system (60) can control the oxygen concentration of the air in the container (11) to be lower than the mean oxygen concentration (8% in this embodiment) of the nitrogen-enriched air produced through the adsorption operation and the desorption operation performed alternately.

Just like in the second operation mode (partial supply operation), if part of the nitrogen-enriched air produced in the desorption operation is not supplied into, but discharged to the outside of, the container (11), the amount of the nitrogen-enriched air supplied into the container (11) is reduced. In this state, if the CA system executes the second operation mode (partial supply operation) when the air in the container (11) has a high oxygen concentration, the oxygen concentration of the air in the container (11) does not decrease smoothly because the amount of the nitrogen-enriched air having a low oxygen concentration supplied into the container (11) is too small.

To cope with such a problem, according to the first embodiment, the first operation mode (whole supply operation) is executed so that the whole nitrogen-enriched air produced in the desorption operation is supplied into the container (11) until the oxygen concentration of the air in the container (11) decreases to a predetermined concentration (8% in this embodiment) or lower. Then, when the oxygen concentration of the air in the container (11) has decreased to some extent, the second operation mode (partial supply operation) is executed so that the nitrogen-enriched air having a relatively high oxygen concentration produced in the initial stage of the desorption operation is discharged, and only the nitrogen-enriched air having a relatively low oxygen concentration is supplied into the container (11). Thus, when the oxygen concentration of the air in the container (11) is relatively high, higher priority is given to the amount of the nitrogen-enriched air to be supplied into the container than to the oxygen concentration thereof, and the whole nitrogen-enriched air produced in the desorption operation is supplied into the container (11). This can quickly lower the oxygen concentration of the air in the container (11). Then, when the oxygen concentration of the air in the container (11) is reduced to some extent, higher priority is given to the oxygen concentration of the nitrogen-enriched air to be supplied into the container than to the amount thereof, and only the nitrogen-enriched air having a relatively low oxygen concentration is supplied into the container (11). This can quickly reduce the oxygen concentration of the air in the container (11) to be much lower (5% in this embodiment).

Further, in the first embodiment, the CA system includes the exhaust connection passage (71) connecting the supply passage (44) and the oxygen discharge passage (45) together, the exhaust on-off valve (72), the supply on-off valve (73), and the controller (55) which controls switching between the gas supply operation and the gas discharge operation through on-off control of the exhaust on-off valve (72) and the supply on-off valve (73). According to the first embodiment, such a simple configuration and simple control of switching the on-off state of the exhaust on-off valve (72) and the supply on-off valve (73) make it easy to execute the second operation mode (partial supply operation) in which the gas supply operation and the gas discharge operation are performed in a switchable manner.

Further, according to the first embodiment, the measurement passage (81) which guides the nitrogen-enriched air produced in the CA system (60) and flowing through the supply passage (44) toward the interior of the container (11) is provided, together with the measurement on-off valve (82) which opens and closes the measurement passage (81). According to this configuration, the controller (55) instructs the measurement on-off valve (82) to open, and the exhaust on-off valve (72) and the supply on-off valve (73) to close, thereby guiding the nitrogen-enriched air flowing through the supply passage (44) toward the oxygen sensor (51). Thus, the supply air measurement operation of measuring the oxygen concentration of the nitrogen-enriched air can be performed. Measuring the oxygen concentration of the nitrogen-enriched air through the supply air measurement operation makes it possible to check the performance of the CA system (60), i.e., determine whether the nitrogen-enriched air of a desired nitrogen concentration is produced or not. That is, whether the CA system (60) has failed or not can be determined by using the oxygen sensor (51) which measures the oxygen concentration of the air in the container (11), without providing a nitrogen concentration sensor for the CA system (60).

In addition, according to the first embodiment, the CA system (60) which executes the second operation mode (partial supply operation) is used. In the second operation mode, the nitrogen-enriched air produced for a predetermined time since the desorption operation was started (each of the first and second operations was started) is not supplied into, but discharged to the outside of the container (11), and then only the nitrogen-enriched air produced until the end of the desorption operation since the predetermined period passed is supplied into the container (11). In this way, part of the nitrogen-enriched air which is produced in the CA system (60) in the initial stage of the desorption operation and has a relatively high oxygen concentration is discharged to the outside of the container, so that only the nitrogen-enriched air produced thereafter having a relatively low oxygen concentration can be supplied into the container (11). Thus, the oxygen concentration of the air in the container (11) can be controlled to be lower than the mean oxygen concentration (8% in this embodiment) of the nitrogen-enriched air produced through the adsorption operation and the desorption operation performed alternately.

First Variation of First Embodiment

If the gas discharge operation is performed, i.e., the nitrogen-enriched air produced during the gas production operation is not supplied into, but discharged to the outside of, the container (11), the amount of the nitrogen-enriched air supplied into the container (11) decreases. If this gas discharge operation is performed too long (the nitrogen-enriched air is discharged too long), the reduction of the oxygen concentration of the air in the container (11) may possibly slow down.

As a solution to this phenomenon, in the first embodiment, time for performing the gas discharge operation, during which the nitrogen-enriched air having a relatively high oxygen concentration produced just after the start of the desorption operation (just after the start of each of the first and second operations) is discharged to the outside of the container, may be set variable. In this configuration, the time for performing the gas discharge operation can be changed as appropriate depending on the state of the interior of the container (11). This can quickly lower the oxygen concentration of the air in the container (11).

Second Embodiment

A second embodiment is a modified version of the first embodiment, in which the configuration of the controller (55) has been partially modified. In the second embodiment, the controller (55) is configured to execute, in addition to the first operation mode (whole supply operation, see FIG. 10) and the second operation mode (partial supply operation, see FIG. 11) described in the first embodiment, a third operation mode (partial supply operation) shown in FIG. 12 so that a concentration control operation is performed. The third operating mode is a modified version of the second operation mode, in which the time for performing the gas discharge operation (time for discharging the nitrogen-enriched air) is increased (to 7 seconds). In the second embodiment, the controller (55) executes the first operation mode (see FIG. 10) and the second operation mode (see FIG. 11) in the same manner as in the first embodiment. If the oxygen concentration of the air in the container (11) decreases to a predetermined concentration, the time for performing the gas discharge operation (the time for discharging the nitrogen-enriched air) is changed from 4 seconds to 7 seconds to execute the third operation mode so as to perform the concentration control operation of reducing the oxygen concentration of the air in the container (11) to a predetermined concentration (3% in this embodiment).

Specifically, if the oxygen concentration of the air in the container measured by the oxygen sensor (51) is higher than 8%, the controller (55) executes the first operation mode in the same manner as in the first embodiment. Then, if the oxygen concentration of the air in the container (11) has decreased to 8% through the first operation mode, the controller (55) executes the second operation mode in the same manner as in the first embodiment. Thereafter, if the oxygen concentration of the air in the container (11) decreases to 5% through the second operation mode, the controller (55) does not select the stop mode of the first embodiment, but changes the time for performing the gas discharge operation from 4 seconds to 7 seconds to execute the third operation mode.

Also in the third operation mode, just like in the first and second operation modes, the controller (55) alternately repeats the first and second operations, with the pressure equalization operation performed during the intervals between the first and second operations, by switching the first and second directional control valves (32) and (33) as shown in FIG. 9. This produces nitrogen-enriched air having a higher nitrogen concentration and a lower oxygen concentration than the outside air (gas production operation).

Also in the third operation mode, the controller (55) instructs the exhaust on-off valve (72) to open and the supply on-off valve (73) to close as shown in FIGS. 7 and 12 for a predetermined time in the initial stage of each of the first and second operations to perform the gas discharge operation of discharging the nitrogen-enriched air produced in the gas production operation to the outside of the container (11) without supplying it into the container (11). Then, the controller (55) instructs the exhaust on-off valve (72) to close and the supply on-off valve (73) to open after the end of the gas discharge operation to perform the gas supply operation of supplying the nitrogen-enriched air produced in the gas production operation into the container (11).

In the third operation mode, the gas discharge operation is performed first, and then the gas supply operation is performed just like in the second operation mode, so that only the nitrogen-enriched air having a lower oxygen concentration than the nitrogen-enriched air produced in the first operation mode is supplied into the container (11). Through the exhaust operation performed simultaneously with the gas discharge operation and the gas supply operation, the air in the container is replaced with the nitrogen-enriched air having a lower oxygen concentration (e.g., a mean oxygen concentration of 3%) than the nitrogen-enriched air supplied into the container (11) in the second operation mode. Thus, the oxygen concentration of the air in the container (11) decreases.

When the oxygen concentration of the air in the container (11) is reduced to 3% through the third operation mode, the controller (55) stops the operation of the gas supply device (30) to stop the gas supply operation, and closes the exhaust valve (46b) to stop the exhaust operation.

Advantages of Second Embodiment

As can be seen, according to the second embodiment, the time for performing the gas discharge operation (the time for discharging the produced nitrogen-enriched air to the outside of the container (11)) is increased with decrease in the oxygen concentration of the air in the container (11). Specifically, after the second operation mode, the operation mode is switched to the third operation mode in which the gas discharge operation is performed longer than in the second operation mode. Thus, when the oxygen concentration of the air in the container (11) is relatively high, higher priority is given to the amount of the nitrogen-enriched air to be supplied into the container than to the oxygen concentration thereof, and the nitrogen-enriched air having a slightly high oxygen concentration is also supplied into the container (11) together with the nitrogen-enriched air having a very low oxygen concentration. This can quickly lower the oxygen concentration of the air in the container (11). Then, when the oxygen concentration of the air in the container (11) is reduced to some extent, higher priority is given to the oxygen concentration of the nitrogen-enriched air to be supplied into the container (11) than to the amount thereof, and only the nitrogen-enriched air having a lower oxygen concentration than the nitrogen-enriched air that has been supplied into the container (11) in the second operation mode is supplied into the container (11). This can quickly reduce the oxygen concentration of the air in the container (11) to be much lower.

According to the first embodiment, the stop mode is executed to reduce the oxygen concentration of the air in the container (11) not only by the inside air control system, but also through the breathing of the plants (15). In contrast, according to the second embodiment, the third operation mode is executed to supply the nitrogen-enriched air having a very low oxygen concentration (having a mean oxygen concentration of 3% in this embodiment) into the container. Thus, in the second embodiment, the oxygen concentration of the air in the container (11) can be reduced to a desired oxygen concentration more quickly than in the first embodiment.

Third Embodiment

Figure 13:
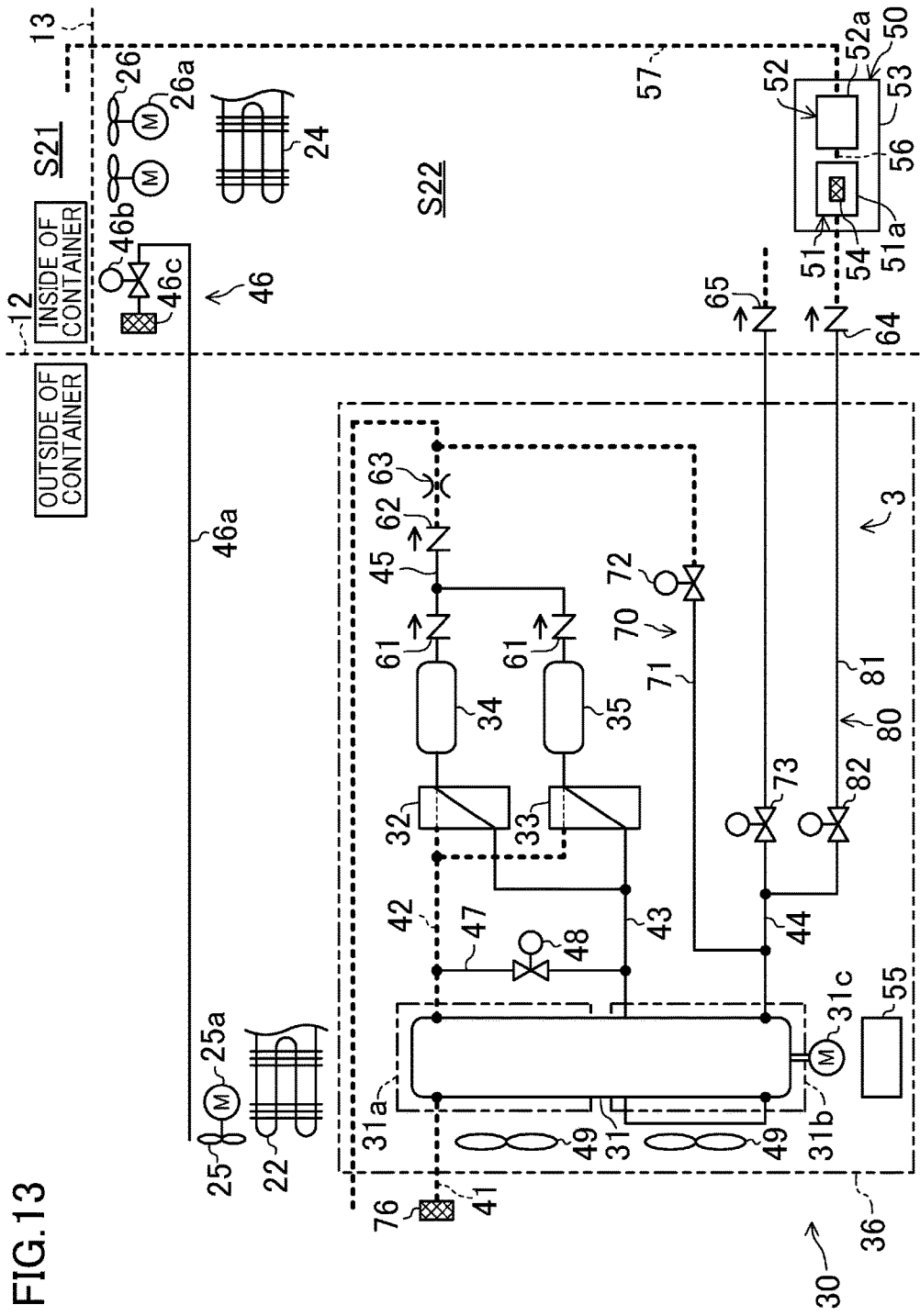
FIG. 13 is a piping diagram illustrating a configuration of a CA system in a container refrigeration apparatus of a third embodiment in a stopped state.

As shown in FIG. 13, in a third embodiment, the controller (55) switches the air circuit (3) to a fourth connection state in which both of the first and second adsorption columns (34) and (35) are connected to the second pump mechanism (31b) of the air pump (31), and executes operation stop control by instructing the bypass on-off valve (48) and the exhaust on-off valve (72) to close, thereby preventing the outside air and the inside air from flowing into the first and second adsorption columns (34) and (35).

Specifically, in the third embodiment, the controller (55) sets the first directional control valve (32) to the second state, and the second directional control valve (33) to the first state to stop the operation of the gas supply device (30). As a result, the inlet of the second pump mechanism (31b) is connected to the first adsorption column (34), and to the second adsorption column (35). Specifically, the air circuit (3) is switched to the fourth connection state where both of the first and second adsorption columns (34) and (35) are connected to the second pump mechanism (31b) of the air pump (31).

Switching to the fourth connection state allows the discharge passage (42) communicating with the external storage space (S1) via the outside air passage (41) and the first pump mechanism (31a) is blocked from the two adsorption columns (34, 35) by the first and second directional control valves (32) and (33). Further, closing the bypass on-off valve (48) allows the suction passage (43) communicating with the two adsorption columns (34, 35) to be blocked from the discharge passage (42) communicating with the external storage space (S1) via the outside air passage (41) and the first pump mechanism (31a). Moreover, closing the exhaust on-off valve (72) allows the oxygen discharge passage (45) communicating with the external storage space (S1) to be blocked from the supply passage (44) communicating with the two adsorption columns (34, 35) via the suction passage (43) and the second pump mechanism (31b). In the air circuit (3), the check valve (62) prevents backflow of the air in the oxygen discharge passage (45), and the air cannot flow from the external storage space (S1) into the two adsorption columns (34, 35). Thus, the operation stop control allows the two adsorption columns (34, 35) to be blocked from the external storage space (S1), thereby preventing the outside air from flowing into the two adsorption columns (34, 35).

Further, in the air circuit (3), the check valve (65) prevents backflow of the air in the supply passage (44), and the check valve (64) prevents backflow of the air in the branch pipe (81). Thus, even if the gas supply device (30) stops operating, the inside air does not flow from the internal storage space (S2) to the two adsorption columns (34, 35).

As can be seen, according to the third embodiment, the controller (55) performs the operation stop control to stop the operation of the gas supply device (30), which can prevent the outside air and the inside air from flowing into the two adsorption columns (34, 35). This can reduce the possibility that the outside air and the inside air flow into the adsorption columns (34, 35) while the operation is stopped, and the adsorbent adsorbs (absorbs) moisture in the air.

Other Embodiments

The above-described embodiments may be modified in the following manner.

In the first and second embodiments, the first operation mode (whole supply operation) has been executed first for controlling the oxygen concentration in the concentration control operation. Alternatively, the first operation mode is not necessarily executed in the present invention. That is, in the first and second embodiments, the first operation mode is not executed, but the second operation mode (partial supply operation) may be executed first. Specifically, in the first and second embodiments, the second operation mode may be executed until the oxygen concentration of the air in the container (11) reaches 5%.

According to the above-described embodiments, a single air pump (31) has been configured to include the first and second pump mechanisms (31a) and (31b). Alternatively, the first and second pump mechanisms (31a) and (31b) may be configured as two separate air pumps.

Moreover, according to the above-described embodiments, two adsorption columns have been used as first and second adsorption portions, respectively, for adsorption and desorption of nitrogen. Alternatively, the number of the adsorption columns serving as a single adsorption portion is not limited to one. For example, each of the adsorption portions may be comprised of three adsorption columns. i.e., six adsorption columns in total may be used.

In addition, according to the above-described embodiments, the CA system (60) of the present invention has been applied to a container refrigeration apparatus (10) provided for a container (11) for use in marine transportation. However, the CA system (60) of the present invention is not limited to such applications. The CA system (60) of the present invention may be used to control the composition of the air in, not only a container for use in marine transportation, but also a container for use in land transportation, a simple refrigerated storage, a normal temperature storage, or any other suitable storage, for example.

INDUSTRIAL APPLICABILITY

As can be seen from the foregoing description, the present invention is useful as a gas supply device which supplies nitrogen-enriched air into a container, and a container refrigeration apparatus having such a gas supply device.

DESCRIPTION OF REFERENCE CHARACTERS

10 Container Refrigeration Apparatus
11 Container
15 Plant
20 Refrigerant Circuit
30 Gas Supply Device
31a First Pump Mechanism (Pressurizing Portion)
31b Second Pump Mechanism (Depressurizing Portion)
34 First Adsorption Column (Adsorption Column)
35 Second Adsorption Column (Adsorption Column)
44 Supply Passage
45 Oxygen Discharge Passage
46 Exhaust Portion
51 Oxygen Sensor
55 Controller
60 CA System (Inside Air Control System)
71 Exhaust Connection Passage
72 Exhaust On-off Valve
73 Supply On-off Valve
81 Branch Pipe (Measurement Passage)
82 Measurement On-Off Valve

The invention claimed is:

1. An inside air control system provided for a container housing breathing plants, the system comprising:
   adsorption columns, each of which houses an adsorbent that adsorbs a nitrogen component in air;
   a first pump mechanism which supplies outside air to the adsorption columns to pressurize the adsorption columns, thereby allowing each of the adsorption columns to perform an adsorption operation of adsorbing the nitrogen component in the air onto the adsorbent; and
   a second pump mechanism which sucks the air from the adsorption columns to depressurize the adsorption columns, thereby allowing each of the adsorption columns to perform a desorption operation of desorbing the nitrogen component adsorbed onto the adsorbent in the air, wherein
   the inside air control system allows the adsorption columns to alternately perform the adsorption operation and the desorption operation so that nitrogen-enriched air having a higher nitrogen concentration and a lower oxygen concentration than the air is produced and supplied into the container,
   the inside air control system performs a partial supply operation of discharging to the outside of the container the nitrogen-enriched air produced for a predetermined time since the desorption operation was started, and then supplying into the container the nitrogen-enriched air produced until the end of the desorption operation since the predetermined time passed, and
   time for discharging the nitrogen-enriched air to the outside of the container in the partial supply operation increases with decrease in the oxygen concentration of the air in the container.

2. The inside air control system of claim 1, wherein
   the inside air control system performs a whole supply operation of supplying the whole nitrogen-enriched air produced during a period from the start to end of the desorption operation into the container until an oxygen concentration of the air in the container reaches a predetermined concentration or lower, and
   the inside air control system performs the partial supply operation when the oxygen concentration of the air in the container has reached the predetermined concentration or lower.

3. The inside air control system of claim 1, further comprising:

a supply passage which is connected to an outlet of the second pump mechanism and guides the nitrogen-enriched air discharged from the second pump mechanism into the container;

an oxygen discharge passage which is connected to the adsorption columns and discharges, out of the inside air control system, oxygen-enriched air having a lower nitrogen concentration and a higher oxygen concentration than the air produced through the adsorption operation in the adsorption columns;

an exhaust connection passage connecting the supply passage and the oxygen discharge passage together;

an exhaust on-off valve provided at the exhaust connection passage to open and close the exhaust connection passage;

a supply on-off valve which is provided at the supply passage to be located further toward the inside of the container than a junction where the exhaust connection passage is connected, and opens and closes the supply passage; and a controller which controls switching between a gas discharge operation in which the exhaust on-off valve is instructed to open and the supply on-off valve is instructed to close so that the nitrogen-enriched air produced is discharged to the outside of the container, and a gas supply operation in which the exhaust on-off valve is instructed to close and the supply on-off valve is instructed to open so that the nitrogen-enriched air produced is supplied into the container.

4. The inside air control system of claim 3, further comprising:

a measurement passage which guides the nitrogen-enriched air flowing through the supply passage toward an oxygen sensor provided in the container; and a measurement on-off valve provided at the measurement passage to open and close the measurement passage, wherein the controller instructs the exhaust on-off valve and the supply on-off valve to close, and the measurement on-off valve to open, thereby performing a supply air measurement operation of allowing the oxygen sensor to measure an oxygen concentration of the nitrogen-enriched air.

5. A container refrigeration apparatus attached to a container housing breathing plants, the apparatus comprising:

a refrigerant circuit which performs a refrigeration cycle to cool air in the container; and an inside air control system including a gas supply device which produces nitrogen-enriched air having a higher nitrogen concentration and a lower oxygen concentration than the air and supplies the nitrogen-enriched air into the container, and an exhaust portion through which the air in the container is exhausted to the outside of the container, the inside air control system controlling a composition of the air in the container, wherein the container refrigeration apparatus controls a temperature and composition of the air in the container to a desired temperature and composition, and the inside air control system is comprised of the inside air control system of claim 1.

* * * * *